(12) United States Patent
Sato et al.

(10) Patent No.: US 12,439,023 B2
(45) Date of Patent: Oct. 7, 2025

(54) IMAGING APPARATUS, METHOD, AND STORAGE MEDIUM

(71) Applicant: CANON KABUSHIKI KAISHA, Tokyo (JP)

(72) Inventors: Kohei Sato, Tokyo (JP); Keisuke Matsuno, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/788,703

(22) Filed: Jul. 30, 2024

(65) Prior Publication Data

US 2025/0071257 A1    Feb. 27, 2025

(30) Foreign Application Priority Data

Aug. 24, 2023  (JP) .................................. 2023-136162
Aug. 24, 2023  (JP) .................................. 2023-136180

(51) Int. Cl.
*H04N 17/00*      (2006.01)
*H04N 23/58*      (2023.01)
*H04N 23/69*      (2023.01)
*H04N 23/695*     (2023.01)
*H04N 23/71*      (2023.01)

(52) U.S. Cl.
CPC .......... *H04N 17/002* (2013.01); *H04N 23/58* (2023.01); *H04N 23/69* (2023.01); *H04N 23/695* (2023.01); *H04N 23/71* (2023.01)

(58) Field of Classification Search
CPC ...... H04N 17/002; H04N 23/58; H04N 23/69; H04N 23/695; H04N 23/71
See application file for complete search history.

(56) References Cited

U.S. PATENT DOCUMENTS

2013/0093930 A1*  4/2013  Mihara .................. H04N 23/71
                                                         348/294
2016/0219206 A1*  7/2016  Miyazaki ............... H04N 23/72
(Continued)

FOREIGN PATENT DOCUMENTS

JP        2001024951 A  *  1/2001
JP        2012095082 A     5/2012
WO   WO-2019021412 A1  *  1/2019 ............. H04N 23/71

*Primary Examiner* — Fernando Alcon
(74) *Attorney, Agent, or Firm* — Cowan, Liebowitz & Latman, P.C.

(57) ABSTRACT

An imaging apparatus includes an imaging element; a mechanism capable of changing a relative position between the imaging element and an object image; a deterioration degree estimation unit that estimates a degree of deterioration through time for each region of the imaging element; a luminance value acquisition unit that acquires a luminance value of a screen corresponding to a first region that is the region in which the degree exceeds a predetermined first threshold, as a first luminance value; a control amount calculation unit that calculates, in a case where the first luminance value exceeds a predetermined first luminance value in a luminance value distribution of an entire screen corresponding to the imaging element, a first control amount of the mechanism in which an object having the predetermined first luminance value or less is allocated to the first region based on the luminance value distribution; and a system control unit that controls the mechanism based on the first control amount.

19 Claims, 17 Drawing Sheets

(56) References Cited

U.S. PATENT DOCUMENTS

| | | | | |
|---|---|---|---|---|
| 2018/0167594 A1* | 6/2018 | Osawa | .................... | H04N 23/70 |
| 2018/0220053 A1* | 8/2018 | Yoshikawa | ............ | H04N 23/64 |
| 2020/0053266 A1* | 2/2020 | Ogushi | ................ | G02B 7/1827 |
| 2020/0314318 A1* | 10/2020 | Harada | .................. | H04N 23/45 |
| 2022/0225857 A1* | 7/2022 | Kojima | ................. | H04N 23/74 |
| 2022/0247910 A1* | 8/2022 | Fukunaga | .............. | H04N 23/76 |
| 2023/0188863 A1* | 6/2023 | Numata | ................. | H04N 23/76 |
| | | | | 348/222.1 |
| 2024/0031683 A1* | 1/2024 | Kaneko | ................. | H04N 25/51 |
| 2024/0292107 A1* | 8/2024 | Kogure | ................. | H04N 23/73 |
| 2025/0039581 A1* | 1/2025 | Jang | .................... | H04N 25/773 |
| 2025/0113624 A1* | 4/2025 | Sekine | ................. | H10F 30/225 |

\* cited by examiner

FRAME 501

| 3000 | 8000 | 8000 | 8000 | 8000 | 5000 | 7000 | 3000 |
|---|---|---|---|---|---|---|---|
| 3000 | 10000 | 8000 | 7000 | 5000 | 4000 | 4000 | 3000 |
| 4000 | 3000 | 3000 | 4000 | 4000 | 4000 | 4000 | 3000 |
| 3000 | 2000 | 2000 | 4000 | 5000 | 6000 | 6000 | 5000 |
| 3000 | 3000 | 5000 | 5000 | 4000 | 2000 | 2000 | 2000 |
| 1000 | 1000 | 1000 | 1000 | 1000 | 2000 | 2000 | 2000 |

FRAME 601

| 4 | 8 | 8 | 8 | 8 | 5 | 7 | 3 |
|---|---|---|---|---|---|---|---|
| 3 | 10 | 8 | 7 | 5 | 4 | 4 | 3 |
| 4 | 3 | 3 | 4 | 4 | 4 | 4 | 3 |
| 3 | 2 | 2 | 4 | 5 | 6 | 6 | 5 |
| 3 | 3 | 5 | 5 | 4 | 2 | 2 | 2 |
| 1 | 1 | 1 | 1 | 1 | 2 | 2 | 2 |

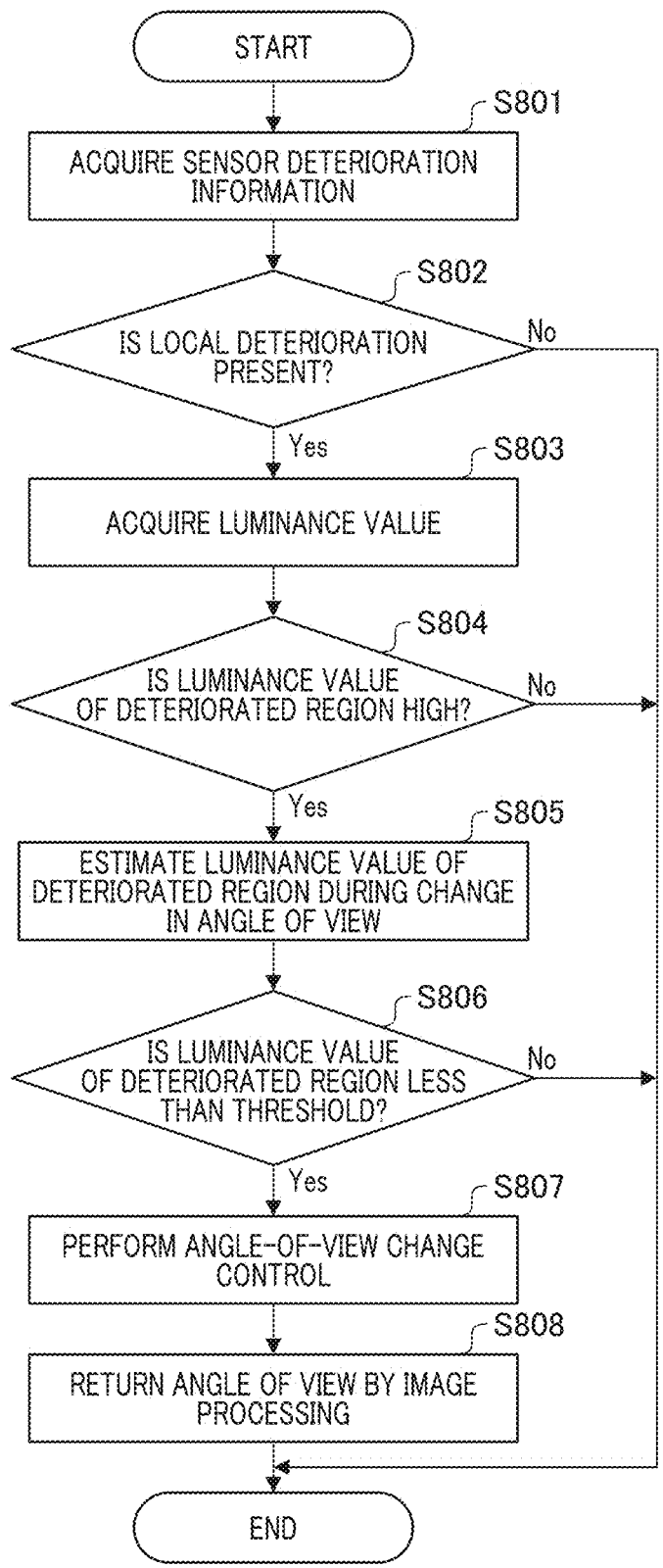

CUTOUT RANGE 902

FRAME 901

| 5 | 7 | 8 | 8 | 8 | 8 | 7 | 7 |
|---|---|---|---|---|---|---|---|
| 4 | 4 | 9 | 8 | 8 | 6 | 4 | 4 |
| 3 | 4 | 10 | 7 | 4 | 4 | 3 | 3 |
| 4 | 3 | 2 | 3 | 4 | 5 | 6 | 6 |
| 3 | 3 | 3 | 4 | 3 | 3 | 6 | 6 |
| 4 | 5 | 5 | 6 | 6 | 6 | 5 | 3 |

| 0.3 | 0.4 | 0.8 | 0.8 | 0.8 | 0.5 | 0.7 | 0.3 |
| --- | --- | --- | --- | --- | --- | --- | --- |
| 0.2 | 0.3 | 1.0 | 0.7 | 0.5 | 0.4 | 0.4 | 0.3 |
| 0.4 | 0.3 | 0.3 | 0.4 | 0.4 | 0.4 | 0.4 | 0.3 |
| 0.3 | 0.2 | 0.2 | 0.4 | 0.5 | 0.6 | 0.6 | 0.5 |
| 0.3 | 0.3 | 0.5 | 0.5 | 0.4 | 0.2 | 0.2 | 0.2 |
| 0.1 | 0.1 | 0.1 | 0.1 | 0.1 | 0.2 | 0.2 | 0.2 |

FIG. 15A  DETERIORATION DEGREES FOR EACH REGION

| 0.3 | 0.4 | 0.8 | 0.8 | 0.8 | 0.5 | 0.7 | 0.3 |
|-----|-----|-----|-----|-----|-----|-----|-----|
| 0.2 | 0.3 | 1.0 | 0.7 | 0.5 | 0.4 | 0.4 | 0.3 |
| 0.4 | 0.3 | 0.3 | 0.4 | 0.4 | 0.4 | 0.4 | 0.3 |
| 0.3 | 0.2 | 0.2 | 0.4 | 0.5 | 0.6 | 0.6 | 0.5 |
| 0.3 | 0.3 | 0.5 | 0.5 | 0.4 | 0.2 | 0.2 | 0.2 |
| 0.1 | 0.1 | 0.1 | 0.1 | 0.2 | 0.2 | 0.2 | 0.2 |

FIG. 15B  LUMINANCE VALUES FOR EACH REGION

| - | - | - | - | - | - | - | 0.6 |
| - | - | - | - | - | - | - | - |
| - | - | - | - | - | - | 0.7 | 0.7 |
| - | - | - | - | - | - | 0.8 | 0.7 |
| - | - | - | - | - | - | 1.0 | 0.9 |
| - | - | - | - | - | - | - | - |

FIG. 15C  EVALUATION VALUES FOR EACH REGION

| - | - | - | - | - | - |
| - | - | - | - | - | 0.42 |
| - | - | - | - | - | - |
| - | - | - | - | 0.56 | - |
| - | - | - | - | 0.56 | 0.56 |
| - | - | - | - | 0.72 | 1.0 |
| - | - | - | - | - | - |
| - | - | - | - | - | - |

| - | - | 0.8 | 0.8 | 0.5 | - | 0.4 | - |
|---|---|---|---|---|---|---|---|
| - | - | 0.3 | 0.4 | - | - | - | - |
| - | - | - | - | - | - | - | - |
| - | - | - | - | - | - | - | - |
| - | - | - | - | - | - | - | - |
| - | - | - | - | - | - | - | - |

IMAGING APPARATUS, METHOD, AND STORAGE MEDIUM

BACKGROUND OF THE INVENTION

Field of the Invention

The present invention relates to an imaging apparatus, a method, a storage medium, and the like.

Description of the Related Art

Some image sensors deteriorate when exposed to light. For example, there is a complementary metal-oxide-semiconductor (CMOS) sensor using color filters used in typical cameras, as one type of image sensor. There has been a drawback that when intense light such as sunlight is applied to the CMOS sensor, a micro-lens and a color filter in a region exposed to the intense light deteriorate due to the influence of ultraviolet rays and heat, and the color fades only in a specific region.

Additionally, for example, a single photon avalanche diode (SPAD) sensor is one type of image sensor. The SPAD sensor counts photons entering a pixel and converts the photons into electric charges as soon as the photons enter the pixel.

The SPAD sensor can detect a large charge generated by avalanche amplification caused by the electrons, as a signal. In the SPAD sensor, noise does not enter during signal readout due to its mechanism, and thus, it is possible to clearly image an object without being affected by noise even in a dark place.

Therefore, the SPAD sensor is expected to be widely used as a sensor used for monitoring applications and the like. When intense light such as sunlight is applied to the SPAD sensor, the micro-lens and the color filter in the region which is exposed to the intense light deteriorate due to the influence of ultraviolet rays and heat, and the pixel that causes avalanche amplification also deteriorates.

The cause of image quality deterioration in the SPAD sensor includes a local change in dark count rate (DCR) in response to a locally applied intense light amount. The DCR is the average of the counts of photons detected in the case of absence of incident light. Local changes in DCR cause image quality deterioration. Additionally, also in the SPAD sensor, the deterioration of the micro lens and the color filter occurs similarly to the CMOS sensor.

In many cases, a panhead camera and a monitoring camera are operated for a long time at a fixed imaging angle of view due to its intended use, and there is a possibility that an intense light source such as sunlight is included at a specific position within the fixed imaging angle of view. In this case, deterioration progresses only in a specific region on the sensor, and image quality partially deteriorates.

For example, Japanese Patent Application Laid-Open No. 2012-095082 discloses a technology for reducing the deterioration of an image element by reading a luminance value of each pixel of the imaging element and adjusting a magnification of a optical zoom and a magnification of a digital zoom unit in a case where the detected value is equal to or higher than a threshold.

However, in the technology disclosed in Japanese Patent Application Laid-Open No. 2012-095082, since an amount of light is detected based on the integral value of the entire imaging element, if intense light is locally applied, the luminance value of a portion to which the intense light is locally applied may not be detected.

Therefore, in the technology disclosed in Japanese Patent Laid-Open No. 2012-095082, it is impossible to avoid local deterioration of the imaging element. Additionally, in the technology disclosed in Japanese Patent Laid-Open No. 2012-095082, the degree of deterioration due to the accumulation of a large amount of light is not taken into consideration, and detection is performed only in the state at that point in time.

SUMMARY OF THE INVENTION

An imaging apparatus of one aspect of the present invention comprising: an imaging element; a mechanism capable of changing a relative position between the imaging element and an object image; an deterioration degree estimation unit that estimates a degree of deterioration through time for each region of the imaging element; a luminance value acquisition unit that acquires a luminance value of a screen corresponding to a first region that is the region in which the degree exceeds a predetermined first threshold, as a first luminance value; a control amount calculation unit that calculates, in a case where the first luminance value exceeds a predetermined first luminance value in a luminance value distribution of an entire screen corresponding to the imaging element based on a first control amount of the mechanism in which an object having the predetermined first luminance value or less is allocated to the first region based on the luminance value distribution; and a system control unit that controls the mechanism based on the first control amount.

Further features of the present invention will become apparent from the following description of embodiments with reference to the attached drawings.

BRIEF DESCRIPTION OF THE DRAWINGS

FIG. 9 is a flowchart illustrating a processing procedure of the second embodiment.

FIG. 15A is a diagram showing an example of deterioration degrees for each region, FIG. 15B is a diagram showing an example of luminance values for each region, and 15C is a diagram showing an example of an evaluation value calculated for each region.

DESCRIPTION OF THE EMBODIMENTS

Figure 1:
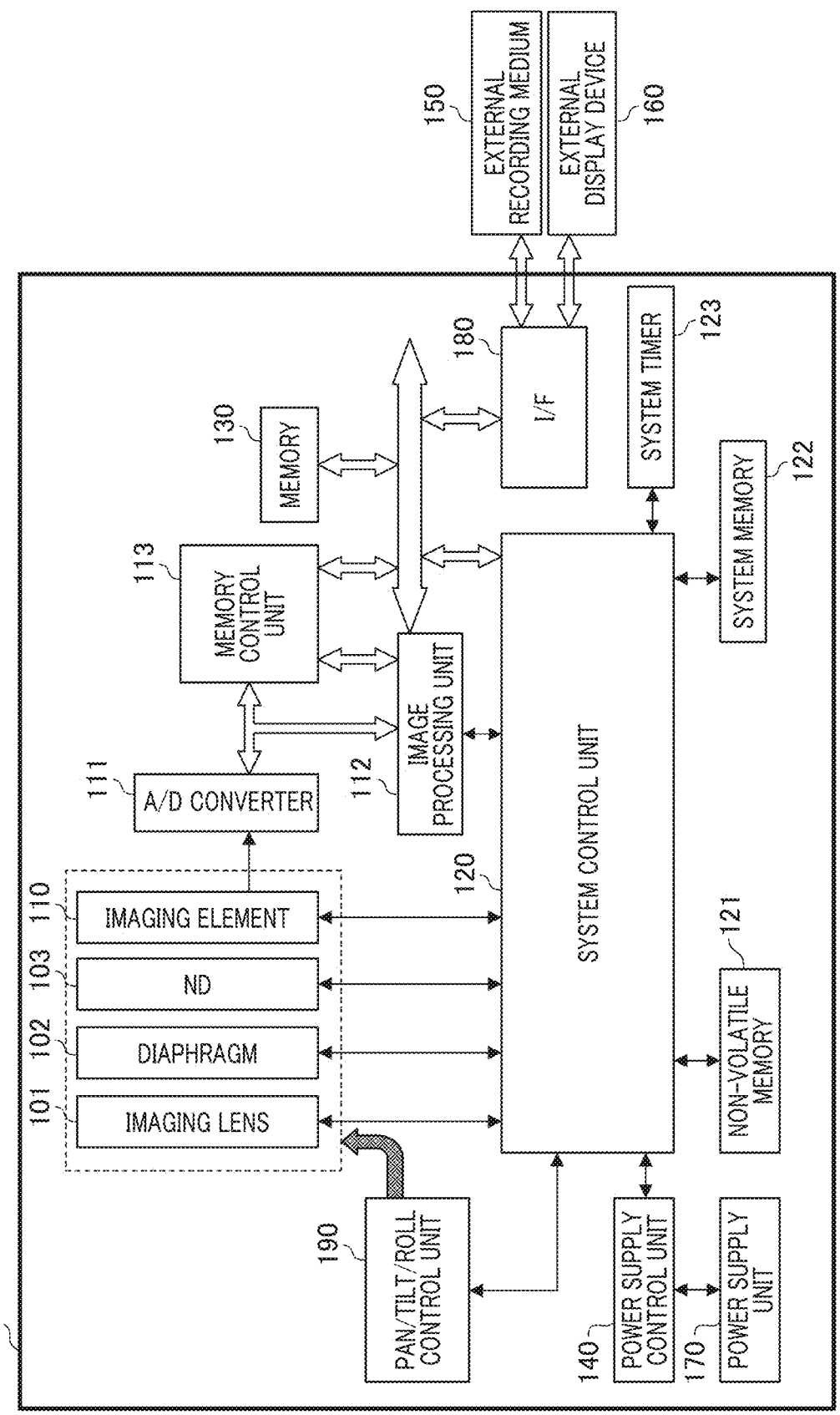
FIG. 1 is a diagram illustrating a configuration example of an imaging apparatus.

Hereinafter, with reference to the accompanying drawings, favorable modes of the present invention will be described using Embodiments. In each diagram, the same reference signs are applied to the same members or elements, and duplicate description will be omitted or simplified.

First Embodiment

An imaging apparatus according to the first embodiment includes an imaging element, a mechanism, a deterioration degree estimation unit, a luminance value acquisition unit, a control amount calculation unit, and a system control unit. The mechanism can change a relative position between the imaging element and the object image.

The deterioration degree estimation unit estimates a degree of deterioration through time for each region of the imaging element. The luminance value acquisition unit acquires a luminance value of a screen corresponding to a first region that is a region where the degree exceeds a predetermined first threshold as a first luminance value.

In a case where the first luminance value exceeds a predetermined first luminance value in a luminance value distribution of the entire screen corresponding to the imaging element, the control amount calculation unit calculates a first control amount of a mechanism in which an object having the predetermined first luminance value or less is allocated to the first region based on the luminance value distribution. The system control unit controls the mechanism based on the first control amount.

Additionally, the luminance value acquisition unit may acquire, a luminance value of the screen corresponding to a second region that is a region where the degree is equal to or less than a predetermined second threshold as a second luminance value. In this case, in a case where the second luminance value is equal to or less than a predetermined second luminance value in the luminance value distribution, the control amount calculation unit calculates the second control amount of a mechanism in which an object having the predetermined second luminance value or less is allocated to the second region, based on the luminance value distribution. Then, the system control unit controls the mechanism based on the second control amount.

Additionally, the mechanism may be a mechanism that controls at least one of a optical zoom, a shift of a lens, a shift of an imaging element, an imaging direction of the imaging apparatus, and a roll of the imaging apparatus.

Additionally, when a plurality of candidates for the first control amount is present, the control amount calculation unit may determine the first control amount based on a magnitude of the first control amount and an amount of change in the luminance value of the first region.

Additionally, in a case where a plurality of candidates for the second control amount is present, the control amount calculation unit may determine the second control amount based on a magnitude of the second control amount and an amount of change in the luminance value of the second region.

Additionally, the control amount calculation unit need not calculate the first control amount in a case where no candidate for the first control amount is present.

Additionally, the control amount calculation unit need not calculate the second control amount in a case where no candidate for the second control amount is present.

Additionally, the imaging apparatus according to the embodiment may include an image processing unit. The image processing unit can execute at least one of change of a cutout range of the image that has been generated by the imaging element, deformation of the image, and rotation of the image, as the image processing.

Additionally, the image processing unit executes image processing so that a difference between a range captured in the image before the mechanism is controlled by the system control unit and a range captured in the image after the mechanism is controlled by the system control unit falls within a predetermined range.

Additionally, the control amount calculation unit may limit the first control amount based on a correction amount that can be processed by the image processing.

Additionally, the control amount calculation unit limits the second control amount based on the correction amount that can be processed by the image processing.

Additionally, in a case where the mechanism is controlled by the system control unit, the image processing unit cancels the image processing.

Additionally, the imaging apparatus according to the embodiment may include a notification unit. The notification unit notifies the user that the range of the image has changed due to the control of the system control unit performed by the mechanism. Alternatively, the notification unit notifies the user that the image quality of the image has changed due to the image processing.

Additionally, the method and the program according to the embodiment include a deterioration degree estimation step, a luminance value acquisition step, a control amount calculation step, and a system control step. In the deterioration degree estimation step, the degree of deterioration through time for each region of the imaging element is estimated.

In the luminance value acquisition step, a luminance value of a screen corresponding to a first region that is a region in which the degree exceeds a predetermined first threshold is acquired as a first luminance value. In the control amount calculation step, in a case where the first luminance value exceeds a predetermined first luminance value in the luminance value distribution of the entire screen corresponding to the imaging element, the processes below are executed.

Specifically, in such a case, in the control amount calculation step, the first control amount of the mechanism capable of changing the relative position between the imaging element and the object image is calculated based on the luminance value distribution so that an object having the predetermined first luminance value or less is allocated to the first region. In the system control step, the mechanism is controlled based on the first control amount.

Additionally, in the method and the program according to the embodiment, the luminance value of the screen corresponding to the second region that is a region in which the degree is equal to or less than the predetermined second threshold is acquired as a second luminance value. In addition, in the method and the program, in a case where the second luminance value is equal to or less than the predetermined second luminance value in the luminance value distribution, the second control amount of the mechanism in which the object having the predetermined second luminance value or less is allocated to the second region is calculated based on the luminance value distribution.

FIG. 1 is a block diagram illustrating a configuration example of an imaging apparatus 100 according to the first embodiment. The imaging apparatus 100 has an imaging lens 101, a diaphragm 102, an ND filter 103, the imaging element 110, an image processing unit 112, a memory control unit 113, a system control unit 120, a non-volatile memory 121, a system memory 122, and a system timer 123.

Furthermore, the imaging apparatus 100 has a memory 130, a power supply control unit 140, a power supply unit 170, an I/F 180, and a pan/tilt/roll control unit 190.

The imaging lens 101 is a lens group including a zoom lens, a focus lens, and a shift lens, and forms an object image. The diaphragm 102 is a diaphragm used for light amount adjustment. The ND filter 103 is a neutral density filter.

The imaging element 110 has an imaging element, performs photoelectric conversion, and outputs digital image data. In the present embodiment, a single photon avalanche diode (hereinafter, referred to as "SPAD") sensor is used as an imaging element. Additionally, the imaging element 110 also has functions of controlling accumulation by an electronic shutter, changing a gain, changing a readout speed, and the like, and a mechanism for shifting the imaging element in a direction perpendicular to the optical axis.

The image processing unit 112 performs image processing on image data from the imaging element 110 or the memory control unit 113. The image processing includes, for example, predetermined pixel interpolation processing, resize processing such as scaling processing, rotation of image and geometric deformation, cutout of image, detection processing of brightness information, color information detection processing for a characteristic object, and the like, color conversion processing, gamma correction processing, and digital gain addition processing and the like.

The image processing method includes image processing performed by a dedicated calculation circuit, image processing performed by a 3D-LUT processing circuit, and the like. Additionally, the image processing unit 112 performs the predetermined calculation processing by using image data from the imaging element 110, and transmits the calculation result to the system control unit 120.

The system control unit 120 performs exposure control, distance measurement control, white balance control, and the like based on the transmitted calculation result. Thus, the system control unit 120 performs through-the-lens (TTL) autofocus (AF) processing, automatic exposure (AE) processing, automatic white balance (AWB) processing, and the like.

Output data from the imaging element 110 are written in the memory 130 via the image processing unit 112 and the memory control unit 113. Alternatively, output data from the imaging element 110 are written to the memory 130 via the memory control unit 113.

The memory 130 stores image data from the imaging element 110 or the image processing unit 112. Additionally, the memory 130 may be used for temporarily storing an image to which image processing has been performed by the image processing unit 112, returning the image to the image processing unit 112 again, and applying another image processing to the image. The memory 130 has a storage capacity sufficient to store a moving image and sound for a predetermined time.

The non-volatile memory 121 is an electrically erasable and recordable memory, for example, an electrically erasable programmable read-only memory (EEPROM). The non-volatile memory 121 stores constants, programs, and the like for the operation of the system control unit 120. The program here is a program for executing various flowcharts to be described below.

The system control unit 120 controls the imaging apparatus 100. The system control unit 120 executes a program recorded in the above-described non-volatile memory 121 to execute each process of the first embodiment to be described below. As the system memory 122, a random access memory (RAM) is used, and constants and variables for the operation of the system control unit 120, a program read out from the non-volatile memory 121, and the like are deployed.

The system timer 123 is a time measurement unit that measures time used for various kinds of control and the time of a built-in clock.

A power supply control unit 140 is configured by a battery detection circuit, a DC-DC converter, a switch circuit for switching a block to be energized, and the like, and detects whether or not battery is installed, the type of the battery, and a remaining battery level. Additionally, the power supply control unit 140 controls the DC-DC converter based on the detection result and an instruction from the system control unit 120 and supplies a necessary voltage to each unit including an external recording medium 150 for a necessary time period.

The power supply unit 170 includes a primary battery, for example, an alkaline battery and a lithium battery, a secondary battery, for example, an NiCd battery, an NiMH battery, and an Li ion battery, and an AC adapter, and the like. The I/F 180 is an interface for connecting to the external recording media 150 such as a memory card and a hard disk, and an external display device 160. The external recording medium 150 is a recording media, for example, a memory card for recording a captured image and performing data transmission and reception to and from the outside, and a semiconductor memory and the like are used.

The pan/tilt/roll control unit 190 adjusts and rotates the optical axis direction by moving the entire imaging apparatus 100 in at least one of the pan direction, the tilt direction, and the roll direction in response to an instruction from the system control unit 120.

Alternatively, the pan/tilt/roll control unit 190 adjusts and rotates the optical axis direction by moving the entire imaging unit in at least one of the pan direction, the tilt direction, and the roll direction in response to an instruction from the system control unit 120. Note that the entire imaging unit includes the imaging lens 101, the diaphragm 102, the ND filter 103, and the imaging element 110.

Figure 2:
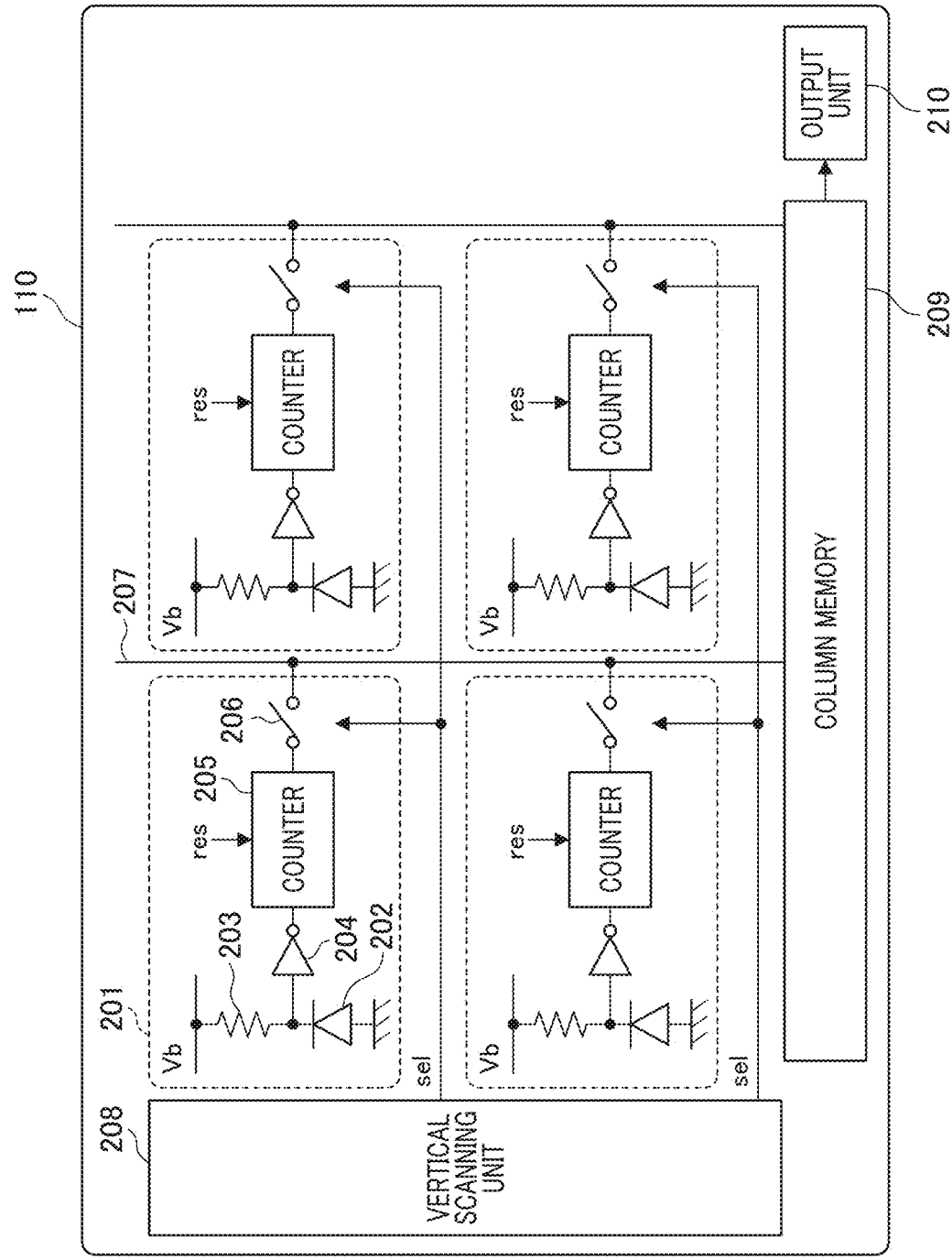
FIG. 2 is a diagram showing a configuration example of an imaging element.

FIG. 2 is a diagram showing an example of the configuration of the imaging element 110 in FIG. 1. The configuration of the imaging element 110 and a method for reading out an image signal from the imaging element 110 will be explained below with reference to FIG. 2. As shown in FIG.

2, the imaging element 110 has a plurality of pixels 201, a vertical scanning unit 208, a column memory 209, and an output unit 210.

Although, in FIG. 2, two pixels 201 having the same structure are arranged in the row direction and two pixels 201 having the same structure are arranged in the column direction, for explanation, in actuality, more pixels 201 are arranged. Additionally, the two pixels 201 that are arranged in the column direction are connected to a vertical signal line 207.

The imaging element 110 is a light receiving element using an SPAD. Each pixel 201 has an avalanche photodiode (hereinafter, referred to as an "APD") 202, a quench resistor 203, an inverter 204, a counter 205, and a readout switch 206.

The pixel 201 is covered with a color filter of a plurality of colors so that a color image is obtained. Light having different wavelength bands transmitted through the color filter is incident on each pixel 201. As the color filter, diverse types can be considered, and for example, a primary color system or a complementary color system may be used, and the type is not limited if a color image can be acquired.

Here, as an example, a case where R, G, and B color filters arranged in a Bayer array are provided will be explained. Note that R means red, G means green, and B means blue.

The APD 202 is an APD that operates in a Geiger mode to detect single photons. The Geiger mode is an operation mode of the APD in which a reverse bias voltage higher than a breakdown voltage is applied to operate.

In the APD 202, when a reverse bias voltage Vbias higher than the breakdown voltage Va is applied to enter the Geiger mode, carriers generated by the incidence of single photons cause avalanche multiplication and a large current is generated. Here, the reverse bias voltage Vbias is, for example, −20V.

The quench resistor 203 is a resistance element for stopping avalanche multiplication of the APD 202. When a photon is incident on the APD 202 and a current is generated due to the avalanche multiplication, a voltage drop occurs in the quench resistor 203.

When this voltage drop causes the voltage of the cathode of the APD 202 to swing from the reverse bias voltage Vbias to the breakdown voltage Va or lower, the avalanche multiplication stops. Subsequently, when the cathode of the APD 202 is charged via the quench resistor 203, the voltage returns to the reverse bias voltage Vbias that is the voltage before the fluctuation again.

In this way, a voltage signal pulse is generated at the cathode of the APD 202 in response to the incidence of single photons. At this time, the width of the voltage signal pulse changes according to the time constant that is determined by the magnitude of the resistance of the quench resistor 203. A sensor unit is configured by the APD 202 and the quench resistor 203.

The inverter 204 serving as a buffer unit functions as a shaping unit, and shapes the waveform of the voltage signal pulse that has generated in the APD 202 as described above, and outputs the waveform-shaped signal pulse to the local output terminal.

The counter 205 receives the signal pulse that has been output from the inverter 204 as an input, and counts the rising edge of the signal pulse. The reason why the inverter 204 is used as the buffer unit is that the counter 205 counts the rising edge.

Additionally, in a case where a buffer unit that does not invert the polarity is used, the counter 205 may count the falling edge of the signal pulse that has been output from the buffer.

It is assumed that, as an example, the counter 205 is configured such that the number of pulses of 16 bits can be counted. In the explanation below, a "count value" refers to a value counted by the counter 205. Additionally, the counter 205 receives a signal pulse res output from the vertical scanning unit 208, and the reset operation of the count value and the start timing of the count operation are controlled.

The readout switch 206 enters an on state upon receiving a signal pulse se1 that is sequentially output for each row by the vertical scanning unit 208. Additionally, the count value held in the counter 205 is written to the column memory 209 via the vertical signal line 207.

As described above, the vertical scanning unit 208 sequentially selects rows of pixels arranged in a matrix, and outputs a signal pulse se1 to each row. Additionally, the vertical scanning unit 208 outputs a signal pulse res for controlling the reset operation of the count value of the counter 205 and the start timing of the count operation.

In the column memory 209, the count value of each pixel 201 of the row selected by the vertical scanning unit 208 by the signal pulse se1 is written via the vertical signal line 207, and the count value of each column is held. Additionally, the vertical scanning unit 208 sequentially selects the count value of each pixel 201 held in the column memory 209 for each column, thereby sequentially outputting the count value of each pixel 201 to the output unit 210.

The output unit 210 performs digital processing such as gain processing and signal rearrangement on the count value of each pixel 201 that has been output from the column memory 209, and outputs the processed image signal to the outside of the imaging element 110.

As described above, the SPAD sensor counts photons entering the pixel 201, and converts the photons into charges as soon as the photons enter the pixel 201. The SPAD sensor can detect a large charge generated by avalanche amplification of electrons constituting the charge, as a signal.

In the SPAD sensor, noise does not enter during signal readout due to its mechanism, and thus, it is possible to clearly image an object without being affected by noise even in a dark place. Therefore, the SPAD sensor is expected to be widely used as a sensor used for monitoring and the like.

An object of the first embodiment is suppressing local image quality deterioration even in a case where a strong light source is included at a specific position within a fixed imaging angle of view.

In the first embodiment, the operation in which the degree of deterioration of the imaging element 110 is estimated by the image processing unit 112, and the control for changing the optical zoom of the imaging lens 101 or the processing for shifting the imaging element 110 is performed by the system control unit 120 based on the result will be explained.

Figure 3:
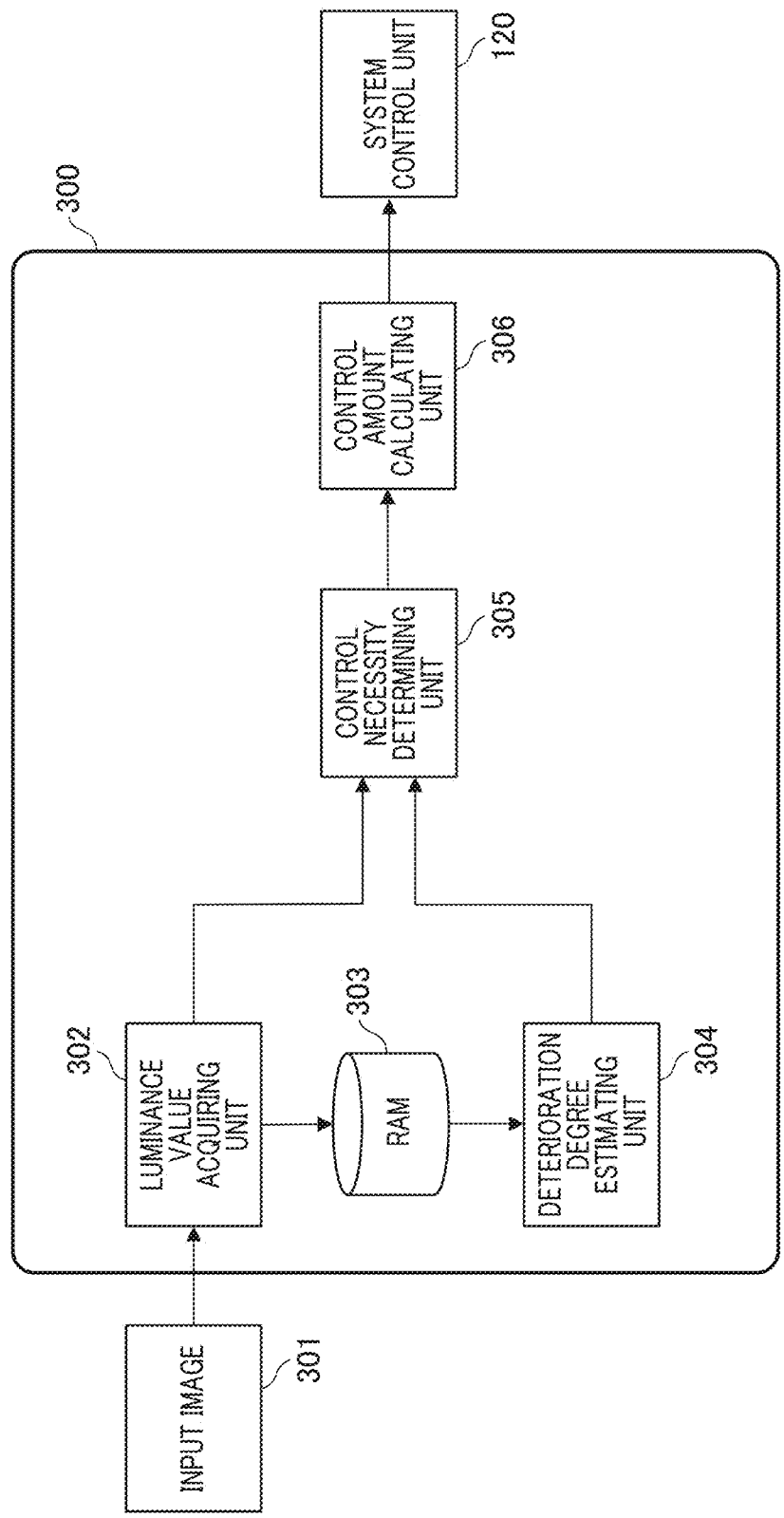
FIG. 3 is a diagram showing a relative position change control parameter acquisition unit.
Figure 4:
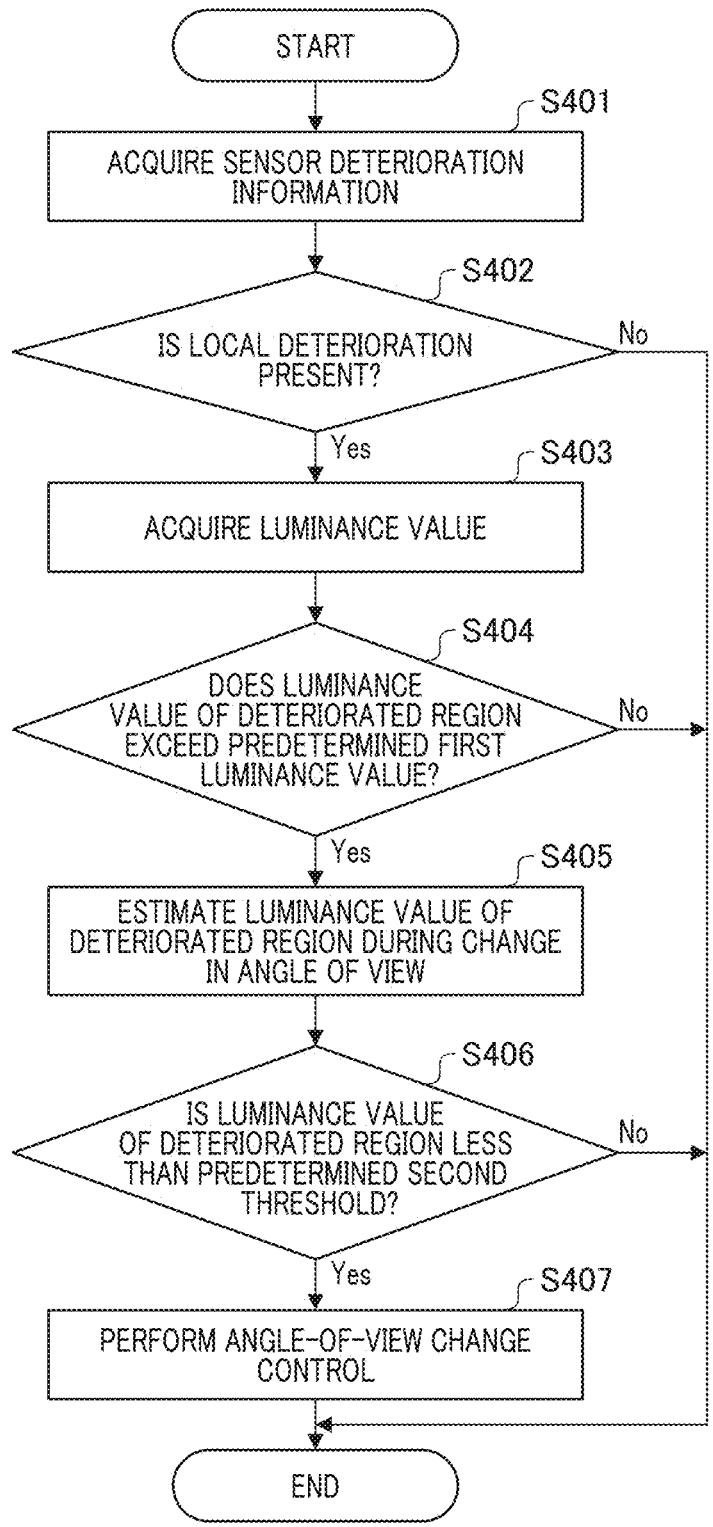
FIG. 4 is a flowchart illustrating a processing procedure of the first embodiment.

FIG. 3 is a diagram illustrating a configuration example of the relative position change control parameter acquisition unit 300 between the object and the imaging element 110. FIG. 4 is a flowchart illustrating processing executed by the image processing unit 112 as shown in FIG. 1. The relative position change control parameter acquiring unit 300 is provided in the image processing unit 112 of FIG. 1, and has a deterioration degree estimating unit 304, a RAM 303, a luminance value acquiring unit 302, a control necessity determining unit 305, and a control amount calculating unit 306.

The relative position change control parameter acquisition unit 300 generates an optical zoom control parameter of the imaging apparatus 100 and a shift parameter of the imaging element 110. The system control unit 120 acquires these parameters. An input image 301 is an image based on the output signal of the imaging element 110.

Figures 5A, 5B:
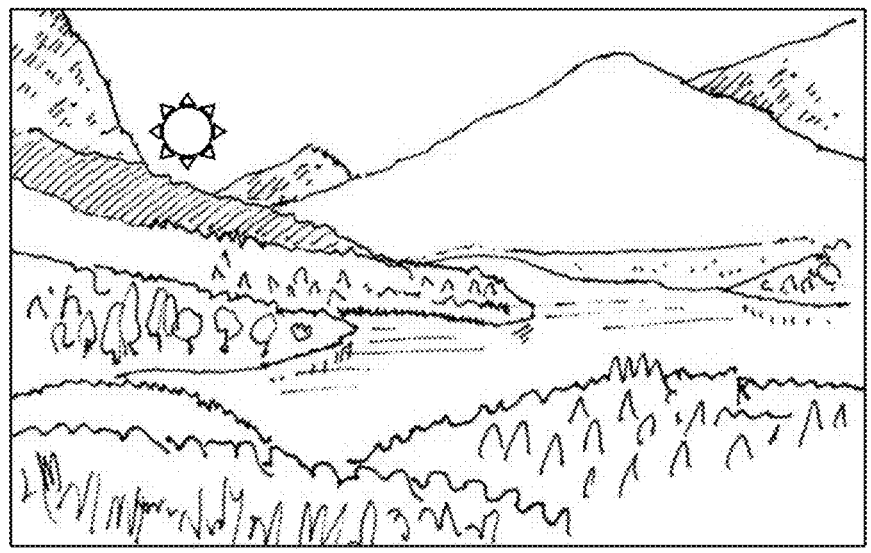
FIG. 5A is a diagram showing an image and FIG. 5B is a diagram showing cumulative luminance values for each region of the image shown in FIG. 5A.

The RAM 303 records a luminance value accumulated for each region of the imaging element 110, and updates the accumulated luminance value by integrating the luminance value for each region that has been newly acquired by the luminance value acquiring unit 302. FIG. 5A is a diagram showing an image and FIG. 5B is a diagram showing cumulative luminance values for each region of the image shown in FIG. 5A. In a case where the angle of view of the imaging apparatus 100 is fixed and the image shown in FIG. 5A is continuously captured, the cumulative luminance value shown in FIG. 5B is obtained. The cumulative luminance value is used as an index of the degree of deterioration.

Although, the case where the imaging element 110 is divided into 8×6 regions is described here as an example, for ease of explanation, the imaging element 110 may be divided into finer regions, or an index of the degree of deterioration in units of pixels may be provided.

It is indicated that as the number is higher, the deterioration of the imaging element 110 progresses, and the possibility of occurrence of image quality deterioration is high. In the upper part of the image shown in FIG. 5A, the score is high because the number of input photons of the imaging element 110 is always large due to the influence of sky and sunlight. In contrast, in the lower part of the image shown in FIG. 5B, the luminance level is low even in the daytime, and the number of input photons of the imaging device 110 is small, so the score is low.

In step S401, the luminance value acquiring unit 302 acquires sensor deterioration information. For example, the luminance value acquiring unit 302 acquires a cumulative luminance value of each region recorded in the RAM 303.

In step S402, the deterioration degree estimating unit 304 determines whether or not local deterioration is present. Specifically, in a case where the cumulative luminance value is higher than that of another region and the cumulative luminance value is equal to or greater than a threshold, the deterioration degree estimating unit 304 determines that this region is deteriorating.

For example, the deterioration degree estimating unit 304 regards a frame 501 as a deteriorated region in the state as shown in FIG. 5B. In a case where no deteriorated region is present, the deterioration degree estimating unit 304 ends the process. In contrast, in a case where a deteriorated region is present, the deterioration degree estimating unit 304 advances the process to step S403.

In step S403, the luminance value acquiring unit 302 acquires the luminance value of each region.

In step S404, the control necessity determination unit 305 determines whether or not the luminance value of the deteriorated region exceeds a predetermined first luminance value in the distribution of the luminance values of each region. In a case where the control necessity determination unit 305 determines that the luminance value of the deteriorated region exceeds the predetermined first luminance value in the distribution of the luminance values of each region, the process proceeds to step S405.

In contrast, in a case where the control necessity determination unit 305 determines that the luminance value of the deteriorated region is equal to or less than the predetermined first luminance value in the distribution of the luminance values of each region, the process ends.

In step S405, the control amount calculating unit 306 provisionally determines the control amount. This control amount is, for example, at least one of zoom control performed by the imaging lens 101, shift control of the imaging element 110, and pan control, tilt control, and roll control performed by the pan/tilt/roll control unit 190. In addition, in a case where the angle of view is changed, the control amount calculating unit 306 estimates the luminance value of the region where the imaging element 110 deteriorates.

For example, an object reflected at a position of 80% of the height increase of the imaging element 110 at the zoom magnification of 2× is reflected at the position of 40% of the height increase by changing the zoom magnification to 1×. Additionally, for example, an object reflected at the center portion of the imaging element 110 is reflected at a position shifted by 1 cm from the center by shifting the imaging element 110 by 1 cm.

Additionally, for example, an object reflected at an end of the imaging element 110 is reflected at the center of the imaging element 110 by performing pan control by an angle corresponding to half the angle of view so that the object is shifted toward the center direction.

In a case where the zoom control, the shift control, the pan control, the tilt control, and the roll control are performed as described above, the control amount calculating unit 306 estimates the luminance value when the object reflected in the deteriorated region of the imaging element 110 changes.

Figures 6A, 6B:
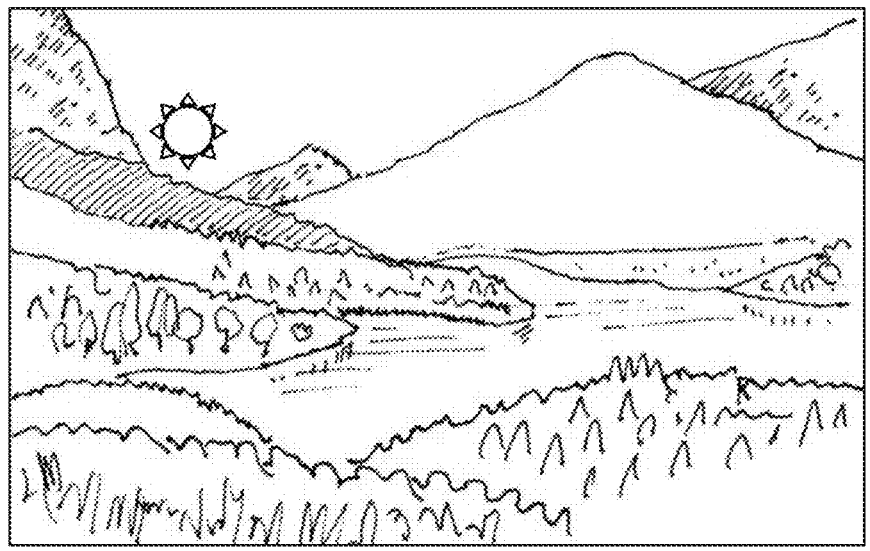
FIG. 6A is a diagram showing an image and FIG. 6B is a diagram showing an example of luminance value estimation of the image shown in FIG. 6A.
Figures 7A, 7B:
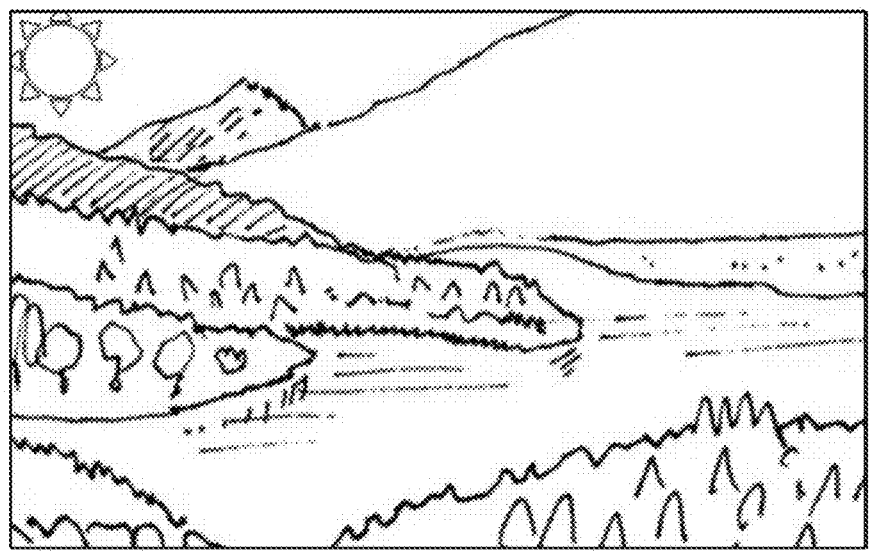
FIG. 7A is a diagram showing a zoom-in image and FIG. 7B is a diagram showing an example of the luminance value estimation of the image shown in FIG. 7A.

FIGS. 6A, 6B and FIGS. 7A, 7N are diagrams showing an example of luminance value estimation in the first embodiment. FIG. 6A is a diagram showing an image and FIG. 6B is a diagram showing an example of luminance value estimation of the image shown in FIG. 6A. FIG. 7A is a diagram showing a zoom-in image and FIG. 7B is a diagram showing an example of the luminance value estimation corresponding to the image shown in FIG. 7A. Here, if a frame 601 is a frame in which the degree of deterioration is large, a high bright object is reflected in the frame 601 in which the degree of deterioration is large, and as a result, the deterioration of the region of the frame 601 further progresses.

Accordingly, when the zoom magnification is increased by the imaging lens 101 and the angle of view is controlled to the telephoto side to obtain the angle of view as shown in FIG. 7A, the distribution of the luminance values becomes as shown in FIG. 7B. As a result, the luminance of the object reflected in the frame 601 is reduced, and the progress of deterioration of the region of the frame 601 can be suppressed.

Note that, in step S405, the control amount calculating unit 306 may estimate the luminance value by changing the control amount a plurality of times and search for the control amount in which the luminance value is minimized, or may compare the luminance value and the control amount and determine the control amount in which both the luminance value and the control amount are minimized.

Figure 8:
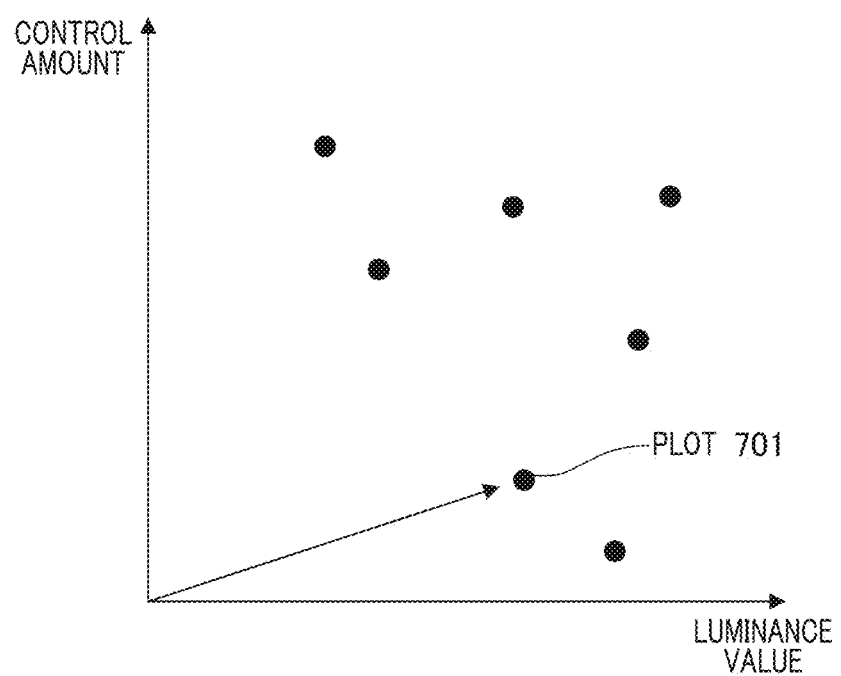
FIG. 8 is a diagram showing a relation between a luminance value and a control amount.

FIG. 8 is a diagram showing the relation between the luminance value and the control amount. In a case where the luminance value and the control amount are compared, there is a method of plotting the relation between the luminance value and the control amount and selecting the control amount having the shortest distance from the origin as indicated by a plot 701, as shown in FIG. 8, as an example.

In step S406, the control amount calculating unit 306 determines whether or not the luminance value of the deteriorated region of the imaging element 110 estimated in step S405 is equal to or less than a predetermined second threshold. Here, the predetermined second threshold is a luminance value of relatively low luminance with respect to the luminance distribution in the screen.

In a case where the control amount calculating unit 306 determines that the luminance value of the deteriorated region of the imaging element 110 estimated in step S405 is equal to or less than the predetermined second threshold, the process proceeds to step S407.

In contrast, in a case where the control amount calculating unit 306 determines that the luminance value of the deteriorated region of the imaging element 110 estimated in step S405 exceeds the predetermined second value, the process ends. Note that in a case where the control amount calculation unit 306 determines that the luminance value of the deteriorated region of the imaging element 110 estimated in step S405 exceeds the predetermined second value, the process may return to step S405.

In step S407, the system control unit 120 performs the angle-of-view changing control by using the control amount provisionally determined in step S405. For example, the system control unit 120 performs at least one of zoom control performed by the imaging lens 101, shift control of the imaging element 110, and pan control, tilt control, and roll control performed by the pan/tilt/roll control unit 190.

As described above, according to the first embodiment, it is possible to allocate a low-luminance object to a deteriorated region of the imaging element 110, and it is possible to suppress local deterioration.

Although, in the explanation of the first embodiment, control is performed such that a low-luminance object is allocated to one deteriorated region of the imaging element 110, the control may be performed such that a low-luminance object is allocated to a plurality of deteriorated regions.

In this case, the control amount may be set such that all the regions have luminance lower than the threshold, or may be set such that the average luminance value of a plurality of deteriorated regions or the weighted average of luminance values taken in consideration the degree of deterioration becomes the lowest.

In addition, in the first embodiment, the control is performed such that the low-luminance object is reflected in the region where the degree of deterioration of the imaging element 110 is high, the control may be performed such that the high-luminance object is reflected in the region where the degree of deterioration is low.

Furthermore, when the processing of the first embodiment is performed, the angle of view changes. Accordingly, the user may be notified that the angle of view has changed by the external display device 160 and the like.

Second Embodiment

In the first embodiment, a method of suppressing local deterioration of the imaging element 110 by controlling the imaging apparatus 100, the imaging lens 101, and the imaging element 110 so that a high-luminance object is not reflected in a region in which the degree of deterioration of the imaging element 110 is high has been explained.

However, an angle of view different from an angle of view originally desired to be captured is obtained as a result of controlling the imaging apparatus 100, the imaging lens 101, the imaging element 110, and the like.

Accordingly, in the second embodiment, a method of suppressing the local deterioration of the imaging element 110 while minimizing the change in the angle of view will be explained.

FIG. 9 is a flowchart for suppressing local deterioration of the imaging element 110 in the second embodiment. Note that the processes from step S801 to step S804 are similar to those from step S401 to step S404 in FIG. 4, and the explanation thereof will not be repeated.

Figures 10A, 10B:
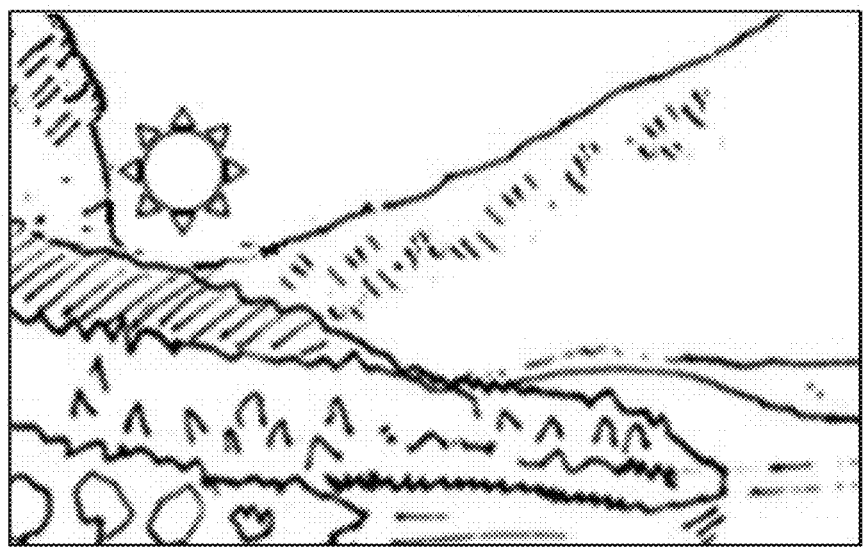
FIG. 10A is a diagram showing an image and FIG. 10B is a diagram showing an example of luminance value estimation of the image shown in FIG. 10A.
Figures 11A, 11B:
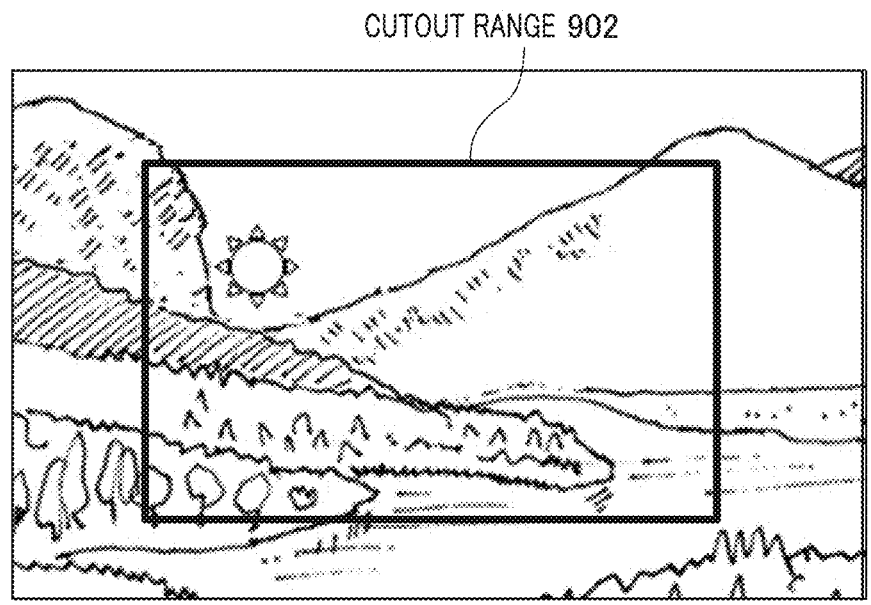
FIG. 11A is a diagram showing an image and FIG. 11B is a diagram showing an example of luminance value estimation of the image shown in FIG. 11A.

The relation between the angle of view control and the luminance value in the second embodiment will be explained with reference to FIG. 10 and FIG. 11. FIG. 10A is a diagram showing an image and FIG. 10B is a diagram showing an example of luminance value estimation of the image shown in FIG. 10A and FIG. 11A is a diagram showing an image and FIG. 11B is a diagram showing an example of luminance value estimation of the image shown in FIG. 11A. In the image shown in FIG. 10A, the luminance value of each region is a value as shown in FIG. 10B.

Here, it is assumed that a frame 901 is the most deteriorated region. That is, the luminance value of the object captured in the region of the frame 901 that deteriorates the most is the highest, and the deterioration of the frame 901 further progresses.

Accordingly, in step S805, the control amount calculating unit 306 provisionally determines a control amount of at least one of zoom control performed by the imaging lens 101, shift control of the imaging element 110, and pan control, tilt control, and roll control performed by the pan/tilt/roll control unit 190.

However, here, the control amount is limited on the premise that the angle of view is returned to the original angle of view by the image processing unit 112. The processing performed by the image processing unit 112 is at least one of image cutout processing for cutting out a specific region of an image, image resizing processing for scaling an image, image rotation processing for rotating an image, and image geometric deformation processing for geometrically deforming an image.

For example, in the image cutout processing, in a case where cutout up to a size of ½ in the vertical and horizontal directions at the minimum with respect to the original image is possible, the zoom magnification of the imaging lens 101 can be controlled up to ½ of the current zoom magnification.

Additionally, for example, in a case where surplus pixels that are not used as a finally output image are present in the peripheral portion of the image, it is possible to perform shift control of the imaging element 110 by an amount corresponding to the surplus number of pixels, and perform pan control and tilt control by the pan/tilt/roll control unit 190.

Here, as an example, a flow of processing when the angle of view is changed to the wide angle by the optical zoom control performed by the imaging lens 101 and then returned to the original angle of view by the image cutout processing and the image resize processing performed by the image processing unit 112 will be explained. Therefore, in step S805, the zoom control amount of the imaging lens 101 is provisionally determined.

In step S806, similarly to step S406 as shown in FIG. 4, the control amount calculating unit 306 determines whether or not the luminance value of the deteriorated region of the imaging element 110 is equal to or less than a predetermined second threshold.

In a case where the control amount calculating unit 306 determines that the luminance value of the deteriorated region of the imaging element 110 is equal to or less than the predetermined second threshold, the process proceeds to step S807. In contrast, in a case where the control amount calculating unit 306 determines that the luminance value of the deteriorated region of the imaging element 110 exceeds the predetermined second threshold value, the process ends.

In step S807, similarly to step S407 as shown in FIG. 4, the system control unit 120 performs the angle-of-view changing control by using the control amount provisionally determined in step S405. For example, the system control unit 120 performs at least one of zoom control, shift control of the imaging element 110, and pan control, tilt control, and roll control performed by the pan/tilt/roll control unit 190.

Here, since the optical zoom is controlled to the wide-angle side, an image as shown in FIG. 11A is obtained. Since the luminance value of each region of this image has a distribution as shown in FIG. 11B, and the luminance value of the region of the frame 901 that deteriorates the most decreases, the deterioration of the region of the frame 901 can be suppressed.

In step S808, the image processing unit 112 cuts out the range indicated by a cut-out range 902, and then performs resizing processing so as to be equivalent to the original number of pixels so that the angle of view that has been changed by the zoom control is returned to the original angle of view. As a result, the angle of view can be returned to the angle of view in FIG. 10A.

As described above, according to the second embodiment, it is possible to allocate a low-luminance object to a deteriorated region of the imaging element 110, suppress local deterioration, and further minimize a change in the angle of view.

Although, in the explanation of the second embodiment, control is performed such that a low-luminance object is allocated to one deteriorated region of the imaging element 110, the control may be performed such that a low-luminance object is allocated to a plurality of deteriorated regions.

In this case, the control amount may be set such that all the regions have luminance lower than the threshold, or may be set such that the average luminance value of a plurality of deteriorated regions or the weighted average of luminance values taken in consideration the degree of deterioration becomes the lowest.

Although, in the second embodiment, the control is performed such that the low-luminance object is reflected in the region where the degree of deterioration of the imaging element 110 is high, the control may be performed such that the high-luminance object is reflected in the region where the degree of deterioration is low.

Furthermore, when the processing of the second embodiment is performed, the change in the angle of view is small, however, the image quality may be affected depending on the processing performed by the image processing unit 112. Therefore, when this control is performed, the user may be notified that the image quality has changed by the external display device 160 and the like.

Note that, since the relation between the deteriorated region of the imaging element 110 and the object luminance changes in a case where the user performs an operation to change the angle of view after this control is performed, the processing performed by the image processing unit 112 in this control may be reset.

Third Embodiment

Next, the third embodiment will be explained. An imaging apparatus according to the third embodiment includes an imaging element, a mechanism, a deterioration degree estimation unit, a luminance value acquisition unit, and a system control unit. The mechanism can change a relative position between the imaging element and the object image.

The deterioration degree estimation unit estimates a degree of deterioration through time for each region of the imaging element. The luminance value acquisition unit acquires a luminance value of a screen corresponding to a region where the degree exceeds a predetermined threshold. The system control unit executes the processing below in a case where the luminance value exceeds a predetermined luminance value in the luminance value distribution of the entire screen corresponding to the imaging element.

Specifically, in such a case, the system control unit executes the search processing of searching for an imaging range in which the luminance value is equal to or less than a predetermined luminance value while changing the relative position between the imaging element and the object image by controlling the mechanism.

Additionally, the mechanism may control at least one of a optical zoom, a shift of a lens, a shift of the imaging element, an imaging direction of the imaging apparatus, and a roll of the imaging apparatus.

Additionally, the system according to the embodiment may further include an evaluation value storage unit that stores an evaluation value based on the luminance value when the imaging range is searched and the deterioration degree of the region. In this case, in a case where the system control unit cannot find an imaging range in which the luminance value is equal to or less than the predetermined luminance value even if the search processing is executed, the system control unit controls the mechanism to set the imaging range in which the evaluation value is minimized in the range in which the search processing is executed.

Additionally, the evaluation value storage unit may store a product of the luminance value and the deterioration degree calculated for each region, as an evaluation value.

Additionally, the evaluation value storage unit may store a total or an average of the stored evaluation values in an arbitrary time period.

Additionally, the imaging apparatus according to the embodiment may further include an image processing unit. The image processing unit can execute at least one of change of a cutout range of the image that has been generated by the imaging element, deformation of the image, and rotation of the image, as the image processing.

Additionally, the image processing unit executes image processing so that a difference between a range included in the image before the mechanism is controlled by the system control unit and a range included in the image after the mechanism is controlled by the system control unit falls within a predetermined range.

Additionally, the control amount calculation unit may limit the control amount of the mechanism based on a correction amount that can be processed by image processing.

Additionally, in a case where the mechanism is controlled by the user, the image processing unit may cancel the image processing.

Additionally, the imaging apparatus according to the embodiment may further include a notification unit that notifies the user that the range included in the image has changed due to the mechanism being controlled by the system control unit.

Additionally, the imaging apparatus according to the embodiment may further include a notification unit that notifies a user that the image quality of the image has changed due to the image processing.

Additionally, the system control unit may issue a warning that the imaging range has changed while the search processing is being executed.

Additionally, in a case where the system control unit cannot find the imaging range in which the luminance value is equal to or less than the predetermined luminance value even if the search processing is executed, the system control unit controls the mechanism so that the imaging range becomes the imaging range in which the luminance value is the minimum in the range in which the search processing is executed.

Additionally, the method and the program according to the embodiment include a deterioration degree estimation step, a luminance value acquisition step, and a search processing execution step. In the deterioration degree estimation step, the degree of deterioration through time for each region of the imaging element is estimated. In the luminance value acquisition step, a luminance value of the screen corresponding to a region where the degree exceeds a predetermined threshold is acquired.

In the search processing execution step, in a case where the luminance value exceeds a predetermined luminance value in the luminance value distribution of the entire screen corresponding to the imaging element, the processing below is executed. Specifically, in such a case, in the search process execution step, the search processing of searching for the imaging range in which the luminance value is equal to or less than the predetermined luminance value is executed while changing the relative position between the imaging element and the object image is executed by controlling the mechanism.

Figure 12:
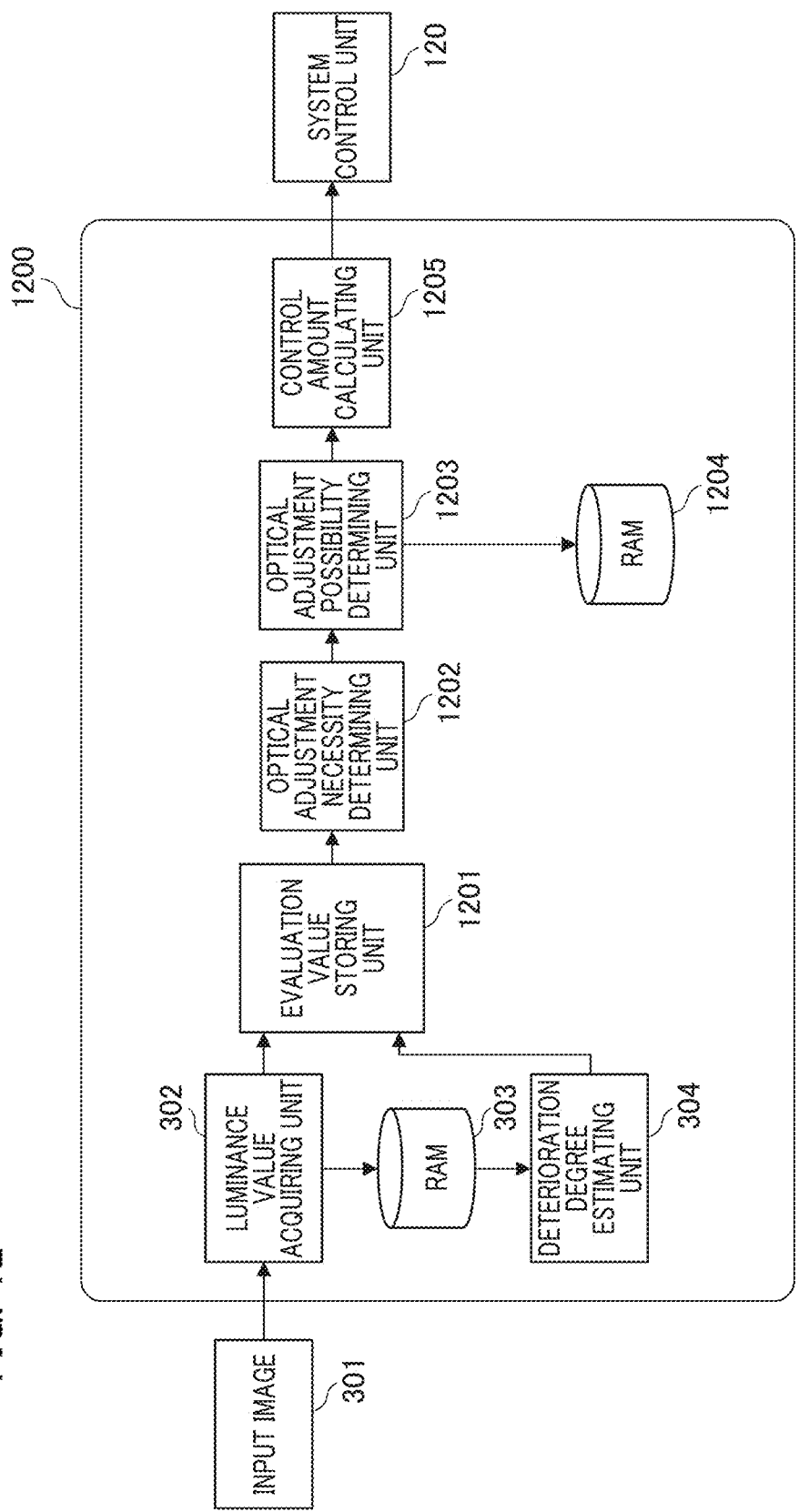
FIG. 12 is a diagram showing a configuration example of a relative position change control parameter acquisition unit 300 of an imaging element 110 and an object in the third embodiment.

FIG. 12 is a diagram showing a configuration example of a relative position change control parameter acquisition unit 1200 between the object and the imaging element 110 in the third embodiment. The relative position change control parameter acquisition unit 1200 is provided in the image processing unit 112 in FIG. 1.

Additionally, the relative position change control parameter acquisition unit 1200 has the luminance value acquiring unit 302, a RAM 303, the deterioration degree estimating unit 304, an evaluation value storing unit 1201, an optical adjustment necessity determining unit 1202, an optical adjustment possibility determining unit 1203, a RAM 1204, and a control amount calculating unit 1205.

The relative position change control parameter acquisition unit 1200 generates optical zoom control parameters of the imaging device 100, shift parameters of the imaging element 110, and the like. The system control unit 120 acquires these parameters. An input image 301 is an image based on the output signal of the imaging element 110.

The luminance value accumulated for each region of the imaging element 110 is recorded in the RAM 303, and the accumulated luminance value is updated by integrating the luminance value for each region newly acquired by the luminance value acquiring unit 302. The deterioration degree estimation unit 304 estimates the deterioration degree of the imaging element 110 based on the accumulated luminance value recorded in the RAM 303.

Next, the evaluation value storing unit 1201 calculates and stores an evaluation value based on the results of the luminance value acquiring unit 302 and the deterioration degree estimating unit 304. Subsequently, the optical adjustment necessity determining unit 1202 determines whether or not the optical adjustment is possible based on the evaluation value of the evaluation value storing unit 1201, and if the optical adjustment is possible, the optical adjustment possibility determining unit 1203 acquires the current state of the imaging apparatus 100 from the RAM 1204, and determines whether or not the optical adjustment is possible.

In the case where the optical adjustment is possible, the control amount calculating unit 1205 calculates a control amount for performing the optical adjustment by a minute amount, and provides the control amount to the system control unit 120.

Figure 13:
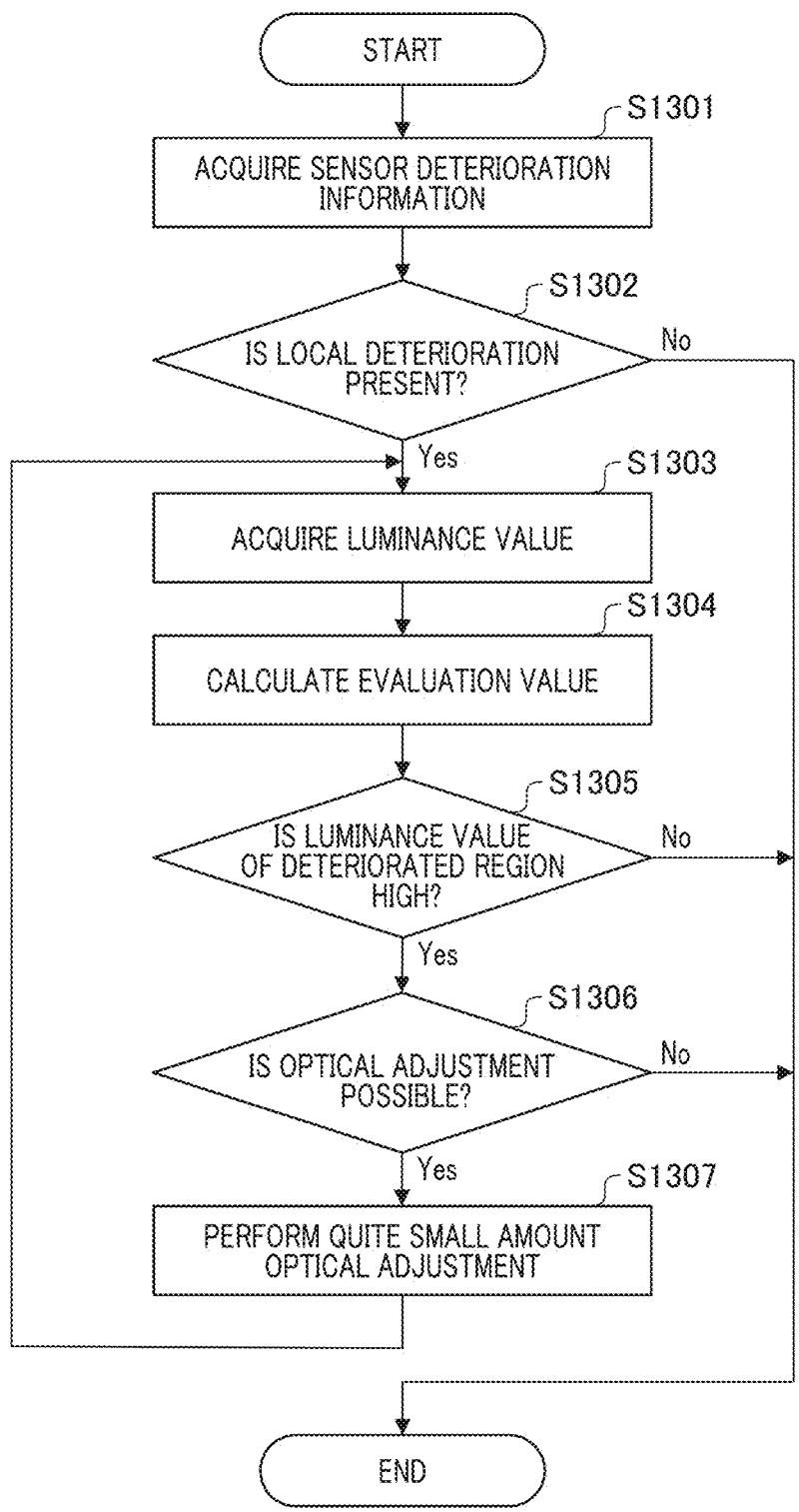
FIG. 13 is a flowchart illustrating a processing method of an image processing unit 112 of the third embodiment.

FIG. 13 is a flowchart showing a processing method of the image processing unit 112 of the third embodiment.

In step S1301, the change degree estimating unit 304 estimates a deterioration degree of the imaging element 110 for each region of the image and records the deterioration degree in the RAM 303. For example, the deterioration degree estimating unit 304 estimates the deterioration degree based on the number of input photons and the like for each region of the imaging element 110. The number of input photons corresponds to the count value output by the imaging element 110. The image processing unit 112 acquires the deterioration degree of the imaging element 110 from the RAM 303.

Figures 14A, 14B:
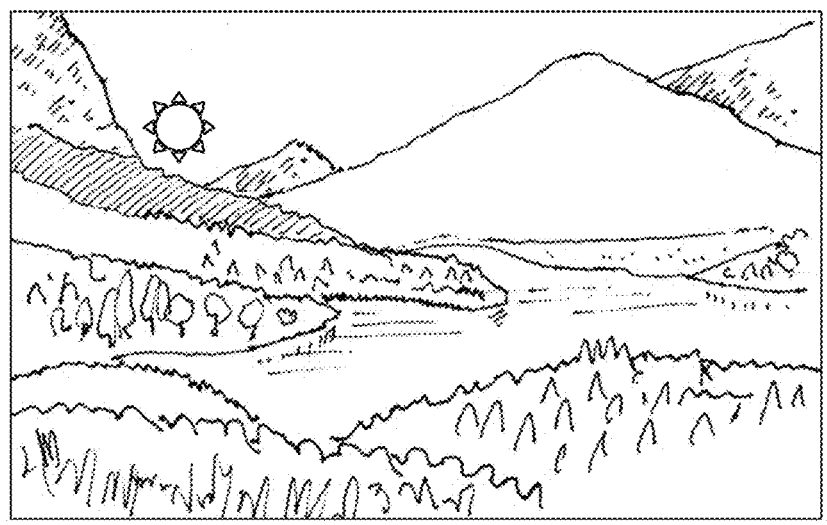
FIG. 14A is a diagram showing an image and FIG. 14B is a diagram showing an example of the degree of deterioration of the imaging element 110 for each region of an image.

FIG. 14A is a diagram showing an image and FIG. 14B is a diagram showing an example of the degree of deterioration of the imaging element 110 for each region of an image. When the imaging apparatus 100 is fixed at the angle of view of the image as shown in FIG. 14A and constantly driven, the degree of deterioration as shown in FIG. 14B is scored and estimated for each of the 8×6 regions.

Although the imaging element 110 is divided into 8×6 regions to simplify the explanation, the imaging lens 101 may be divided into smaller regions or may have an index of the degree of deterioration in units of pixels. The score is represented by 0.0 to 1.0, and it is shown that as the number is higher, the deterioration of the imaging element 110 progresses, and the possibility of occurrence of image quality deterioration is high.

The upper portion of the image in FIG. 14A has a high score since the number of input photons of the imaging element 110 is always large due to the influence of the sky or sunlight. In contrast, the lower portion of the image in FIG. 14A has a low brightness level even in the daytime, and has a low score because the number of input photons of the imaging element 110 is small.

Note that the deterioration degree estimating unit 304 may estimate the deterioration degree based on the accumulated value of the output signals for each region of the imaging element 110 of each frame.

In step S1302, the image processing unit 112 determines whether or not local deterioration is present based on the deterioration degree index that has been calculated in step S1301. For example, the image processing unit 112 determines that local deterioration is present in a case where one or more of the deterioration degree indexes for each region are equal to or greater than a threshold, and determines that no local deterioration is present in a case where no region equal to or greater than the threshold is present.

In a case where the image processing unit 112 determines that local deterioration is present, the process proceeds to step S1303. In contrast, in a case where the image processing unit 112 determines that no local deterioration is present, the process ends.

In step S1303, the luminance value acquiring unit 404 acquires the luminance value of the input image 301 for each region of the image.

In step S1304, the evaluation value storing unit 1201 calculates and stores an evaluation value based on the deterioration degree index estimated by the deterioration degree estimating unit 304 and the luminance value acquired from the luminance value acquiring unit 404. FIG. 15A is a diagram showing an example of deterioration degrees for each region, FIG. 15B is a diagram showing an example of luminance values for each region, and 15C is a diagram showing an example of an evaluation value calculated for each region. In S. 15A to 15C, the evaluation values are calculated by the product of the degree of deterioration for each region and the luminance value for each region. Although, here, the evaluation value is calculated by simple multiplication, it may be calculated by, for example, weighting.

In step S1305, the optical adjustment necessity determining unit 1202 determines whether or not the luminance value of the deteriorated region is high based on the evaluation value calculated in step S1304. For example, in a case where the deterioration degree of each region is in the state shown in FIG. 15, the evaluation value of the region having the deterioration degree of 0.7 or more is evaluated, and if the evaluation value is 0.5 or more, it is determined that the luminance value of the deteriorated region is high, and if the evaluation value is less than 0.5, it is determined that the luminance value of the deteriorated region is low.

For example, in a case where the optical adjustment necessity determining unit 1202 determines that one or more regions in which the luminance value can be determined to be high among the deteriorated regions is present, the process proceeds to step S1306. In contrast, in a case where the optical adjustment necessity determining unit 1202 determines that no region in which the luminance value can be determined to be high among the deteriorated regions is present, the process ends.

In step S1306, the optical adjustment possibility determining unit 1203 determines whether or not optical adjustment is possible based on the current state of the imaging apparatus 100 that has been acquired from the RAM 1204. For example, in a case where the parameter of the optical zoom is separated from the wide end by a predetermined amount or more, or in a case where a predetermined amount or more of surplus pixels of the imaging element 110 are present, the optical adjustment possibility determining unit 1203 determines that the optical adjustment is possible.

In contrast, in a case where the parameter of the optical zoom is within the predetermined amount from the wide end and the number of surplus pixels of the imaging element 110 is less than the predetermined amount, the optical adjustment possibility determining unit 1203 determines that the optical adjustment is impossible.

In a case where the optical adjustment possibility determining unit 1203 determines that the optical adjustment is possible, the process proceeds to step S1307. In contrast, in a case where the optical adjustment possibility determining unit 1203 determines that the optical adjustment is impossible, the process ends.

In step S1307, the control amount calculating unit 1205 calculates a minute optical adjustment amount based on the current state of the imaging apparatus 100, and performs the minute amount optical adjustment. Then, the control amount calculating unit 1205 returns the process to step S1303.

The system control unit 120 executes at least one of zoom control performed by the imaging lens 101, shift control of the imaging element 110, and pan control, tilt control, and roll control performed by the pan/tilt/roll control unit 190 based on the minute optical adjustment amount.

Figures 16A, 16B:
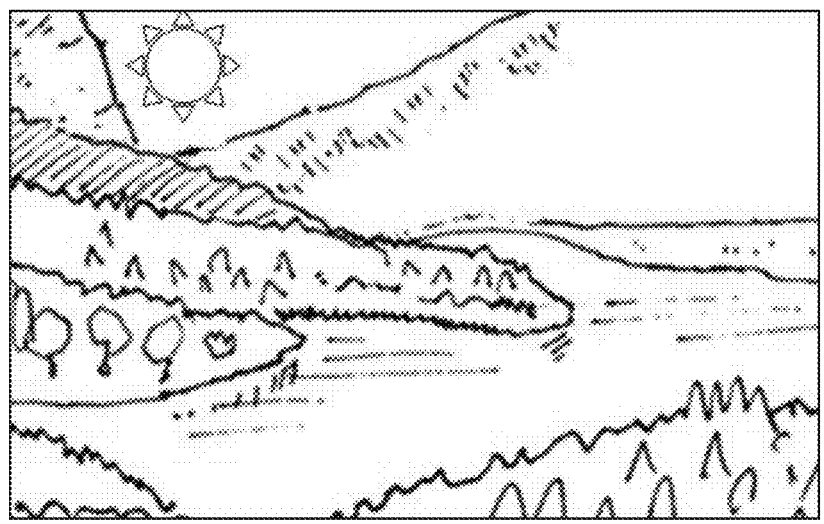
FIG. 16A is a diagram showing an image and FIG. 16B is a diagram showing examples of the effect of performing a minute amount of optical adjustment by using optical zoom from the state of FIG. 14A.

FIG. 16A is a diagram showing an image and FIG. 16B is a diagram showing examples of the effect of performing a minute amount of optical adjustment by using optical zoom from the state of FIG. 14A. When the angle of view is changed from the angle of view of the image as shown in FIG. 14A to the wide side by optical zoom, the image as shown in FIG. 16A is obtained as the input image 301. At the angle of view as shown in FIG. 16A, the luminance value acquired by the luminance value acquiring unit 302 changes from FIG. 14B, as shown in FIG. 16B.

The optical adjustment necessity determination unit 1202 repeats the above-described processing until a region determined to have a high luminance value among the deteriorated regions is not present, determines a final optical adjustment amount, and changes the state of the imaging apparatus 100.

As described above, according to the third embodiment, it is possible to suppress local image quality deterioration even in a case where an intense light source is included at a specific position within a fixed imaging angle of view.

Although, in the third embodiment, the operation in the case where the local image quality deterioration is suppressed by changing the angle of view to the wide side by using the optical zoom has been explained, the image processing may be performed by the image processing unit 112 so that the angle of view becomes the original angle of view after the optical adjustment. That is, it is possible to suppress local image quality deterioration without changing the angle of view by performing digital zoom processing so as to cancel a zoom amount after using the optical zoom.

In addition, although, in the third embodiment, the optical adjustment necessity determination unit 1202 repeats the processing until no region determined to have a high luminance value among the deteriorated regions is present, the processing may be repeated a predetermined number of times, and among these, an optical adjustment amount in which the evaluation value stored in the evaluation value storing unit 1201 is optimal may be determined as a final parameter.

In addition, although in the third embodiment, the operation in the case where a minute optical adjustment amount is calculated based on the current state of the imaging apparatus 100 has been explained, if an appropriate adjustment amount can be estimated from the evaluation value of the evaluation value storing unit 1201, the processing may be started after the optical adjustment is first performed with this adjustment amount.

Fourth Embodiment

Next, the fourth embodiment of the present invention will be explained. The explanation of the components that are the same as those in the third embodiment will be omitted.

In the third embodiment, since the processing is performed in a case where the local deterioration of the imaging element 110 progresses by a predetermined amount, the influence of the image quality deterioration is made inconspicuous after the image quality deterioration, and the deterioration cannot be prevented in advance. Accordingly, in the fourth embodiment, an operation in a case where processing for preventing local deterioration of the imaging element 110 is performed beforehand based on the result of the luminance value acquiring unit 302 will be explained.

Figure 17:
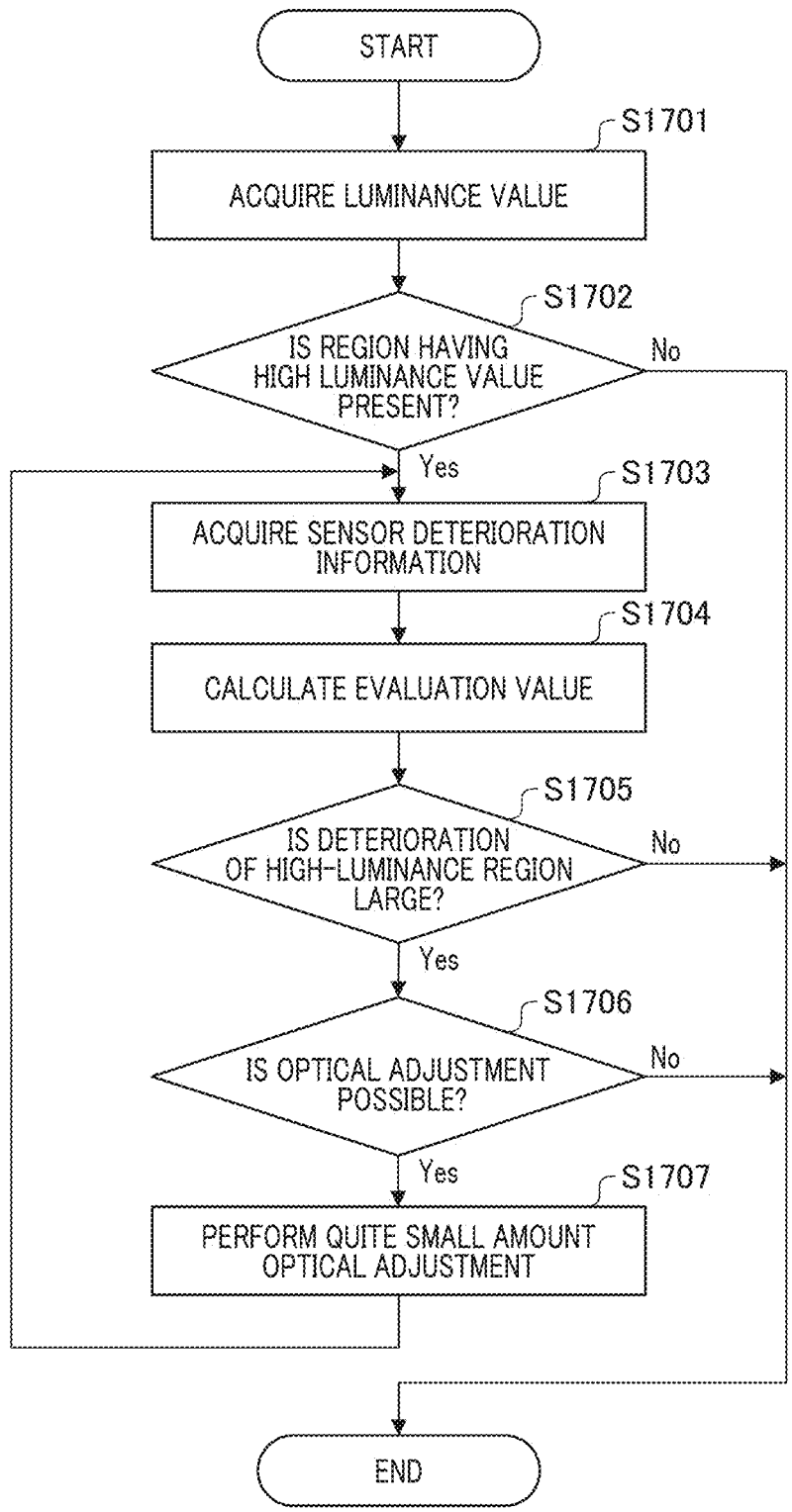
FIG. 17 is a flowchart illustrating a processing method of the image processing unit 112 according to the fourth embodiment.

FIG. 17 is a flowchart illustrating a processing method of the image processing unit 112 according to the fourth embodiment.

In step S1701, the image processing unit 112 performs the process that is similar to that in step S1303 in FIG. 13.

In step S1702, the image processing unit 112 determines whether or not there is a region in which the luminance value is high based on the luminance value that has been acquired in step S1701. For example, the image processing unit 112 determines that a region in which the luminance value is high is present in a case where one or more of the luminance values of the regions are equal to or greater than a threshold, and it determines that no region in which the luminance value is high is present in a case where no region in which the luminance value is equal to or greater than a threshold is present.

In a case where the image processing unit 112 determines that a region in which the luminance value is high is present, the process proceeds to step S1703. In contrast, in a case where the image processing unit 112 determines that no region in which the luminance value is high is present, the process ends.

In step S1703, the image processing unit 112 performs the process that is similar to that in step S1301 in FIG. 13.

In step S1704, the image processing unit 112 performs the process that is similar to that in step S1304 in FIG. 13.

In step S1705, the optical adjustment necessity determination unit 1202 determines whether or not the degree of deterioration of a region in which the luminance value is high is high based on the evaluation value that has been calculated in step S1704. For example, in a case where one or more regions determined to have a high degree of deterioration among the regions in which the luminance value is high is present, the optical adjustment necessity determination unit 1202 determines that the degree of deterioration in a region in which the luminance value is high is high.

Additionally, for example, in a case where no region determined to have a high degree of deterioration is present among the regions in which the luminance value is high, the optical adjustment necessity determination unit 1202 determines that the degree of deterioration in a region in which the luminance value is high is not high. In a case where the optical adjustment necessity determination unit 1202 determines that the deterioration degree in the region in which the luminance value is high is high, the process proceeds to step S1706. In contrast, in a case where the optical adjustment necessity determination unit 1202 determines that the deterioration degree in the region in which the luminance value is high is not high, the process ends.

In step S1706, the image processing unit 112 performs the process that is similar to that in step S1306 in FIG. 13.

In step S1707, the image processing unit 112 performs the process that is similar to that in step S1307 in FIG. 13.

The above-described processing is repeated until the optical adjustment necessity determination unit 1202 determines that no region in which the luminance value is high among the deteriorated regions is present, the final optical adjustment amount is determined, and the state of the imaging apparatus 100 is changed.

As described above, according to the fourth embodiment, even in a case where an intense light source is included at a specific position within a fixed imaging angle of view, it is possible to prevent local image quality deterioration beforehand.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the imaging apparatus and the like through a network or various storage media. Then, a computer (or a CPU, an MPU, or the like) of the imaging apparatus and the like may be configured to read and execute the program. In such a case, the program and the storage medium storing the program configure the present invention.

In addition, the present invention includes those realized using at least one processor or circuit configured to perform functions of the embodiments explained above. For example, a plurality of processors may be used for distribution processing to perform functions of the embodiments explained above.

This application claims the benefit of priority from Japanese Patent Application No. 2023-136162, filed on Aug. 24, 2023, and Japanese Patent Application No. 2023-136180, filed on Aug. 24, 2023, both of which are hereby incorporated by reference herein in its entirety.

What is claimed is:

1. An imaging apparatus comprising:
an imaging element;
a mechanism capable of changing a relative position between the imaging element and an object image; and
at least one memory storing instructions; and at least one processor that, upon execution of the stored instructions cause the at least one processor to:
estimate a degree of deterioration through time for each region of the imaging element;
acquire a luminance value of a screen corresponding to a first region that is the region in which the degree exceeds a predetermined first threshold, as a first luminance value;
calculate, in a case where the first luminance value exceeds a predetermined first luminance value in a luminance value distribution of an entire screen corresponding to the imaging element, a first control amount of the mechanism in which an object having the predetermined first luminance value or less is allocated to the first region based on the luminance value distribution, and
control the mechanism based on the first control amount.

2. The imaging apparatus according to claim 1,
wherein a luminance value of a screen corresponding to a second region that is the region in which the degree is equal to or less than a predetermined second threshold is acquired as a second luminance value,
wherein, in a case where the second luminance value is equal to or less than a predetermined second luminance value in the luminance value distribution, a second control amount of the mechanism, in which an object having the predetermined second luminance value or less is allocated to the second region, is calculated based on the luminance value distribution, and
wherein the mechanism is controlled based on the second control amount.

3. The imaging apparatus according to claim 1, wherein the mechanism controls at least one of an optical zoom, a shift of a lens, a shift of the imaging element, an imaging direction of the imaging apparatus, and a roll of the imaging apparatus.

4. The imaging apparatus according to claim 1, wherein in a case where a plurality of candidates for the first control amount is present, the first control amount is determined based on a magnitude of the first control amount and an amount of change in a luminance value of the first region.

5. The imaging apparatus according to claim 2, wherein in a case where a plurality of candidates for the second control amount is present, the second control amount is determined based on a magnitude of the second control amount and an amount of change in a luminance value of the second region.

6. The imaging apparatus according to claim 2, wherein at least one of change of a cutout range of an image generated by the imaging element, deformation of the image, and rotation of the image can be executed as image processing, and the image processing is executed such that a difference between a range included in the image before the mechanism is controlled and a range included in the image after the mechanism is controlled falls within a predetermined range.

7. A method comprising:
acquiring a degree of deterioration through time for each region of an imaging element;
acquiring a luminance value of a screen corresponding to a first region, which is the region in which the degree exceeds a predetermined first threshold, as a first luminance value;
calculating, in a case where the first luminance value exceeds a predetermined first luminance value in a luminance value distribution of an entire screen corresponding to the imaging element, a first control amount of a mechanism capable of changing a relative position between the imaging element and an object image based on the luminance value distribution so that an object having the predetermined first luminance value or less is allocated to the first region, and
controlling the mechanism based on the first control amount.

8. The method according to claim 7, further comprising:
acquiring a luminance value of a screen corresponding to a second region that is the region in which the degree is equal to or less than a predetermined second threshold, as a second luminance value;
calculating, in a case where the second luminance value is equal to or less than a predetermined second luminance value in the luminance value distribution, a second control amount of the mechanism in which an object having the predetermined second luminance value or less is allocated to the second region based on the luminance value distribution; and
controlling the mechanism based on the second control amount.

9. A non-transitory computer-readable storage medium configured to store a computer program comprising instructions for executing following processes:
causing a process of estimating a degree of deterioration through time for each region of an imaging element to be executed;
causing a process of acquiring a luminance value of a screen corresponding to a first region that is the region in which the degree exceeds a predetermined first threshold, as a first luminance value to be executed;
causing a process of calculating, in a case where the first luminance value exceeds a predetermined first luminance value in a luminance value distribution of an entire screen corresponding to the imaging element, a first control amount of a mechanism that is capable of changing a relative position between the imaging element and an object image so that an object having the predetermined first luminance value or less is allocated to the first region, based on the luminance value distribution, to be executed; and
causing a process of controlling the mechanism based on the first control amount to be executed.

10. The storage medium of claim 9, wherein the computer program is further comprising instructions for executing following processes:

causing a process of acquiring a luminance value of a screen corresponding to a second region that is the region in which the degree is equal to or less than a predetermined second threshold as a second luminance value to be executed;
causing a process of calculating, in a case where the second luminance value is equal to or less than a predetermined second luminance value in the luminance value distribution, a second control amount of the mechanism in which an object having the predetermined second luminance value or less is allocated to the second region based on the luminance value distribution to be executed, and
causing a process of controlling the mechanism based on the second control amount to be executed.

11. An imaging apparatus comprising:
an imaging element;
a mechanism capable of changing a relative position between the imaging element and an object image;
at least one memory storing instructions; and at least one processor that, upon execution of the stored instructions cause the at least one processor to:
estimate a degree of deterioration through time for each region of the imaging element;
acquire a luminance value of a screen corresponding to the region in which the degree exceeds a predetermined threshold; and
execute, in a case where the luminance value exceeds a predetermined luminance value in a luminance value distribution of an entire screen corresponding to the imaging element, search processing for searching for an imaging range in which the luminance value is equal to or less than the predetermined luminance value while changing a relative position between the imaging element and the object image by controlling the mechanism.

12. The imaging apparatus according to claim 11, wherein the mechanism controls at least one of an optical zoom, a shift of a lens, a shift of the imaging element, an imaging direction of the imaging apparatus, and a roll of the imaging apparatus.

13. The imaging apparatus according to claim 11, wherein an evaluation value based on the luminance value during a search for the imaging range and a degree of deterioration of the region is stored, and
wherein, in a case where an imaging range in which the luminance value is equal to or less than a predetermined luminance value cannot be found even if the search processing is executed, the mechanism is controlled so that an imaging range in which the evaluation value is minimized in a range in which the search processing is executed is obtained.

14. The imaging apparatus according to claim 13, wherein a product of the luminance value and the deterioration degree calculated for each region is stored as the evaluation value.

15. The imaging apparatus according to claim 13, wherein a sum or an average of the evaluation value that has been stored in an arbitrary time-period is stored.

16. The imaging apparatus according to claim 11, wherein at least one of change of a cutout range of an image generated by the imaging element, deformation of the image, and rotation of the image can be executed as image processing, and the image processing is executed such that a difference between a range included in the image before the mechanism is controlled and a range included in the image after the mechanism is controlled falls within a predetermined range.

17. The imaging apparatus according to claim 11, wherein, in a case where an imaging range in which the luminance value is equal to or less than a predetermined luminance value cannot be found even if the search processing is executed, the mechanism is controlled so that an imaging range in which the luminance value is minimized in a range in which the search processing is executed is obtained.

18. A method comprising:
estimating a degree of deterioration through time for each region of an imaging element;
acquiring a luminance value of a screen corresponding to the region in which the degree exceeds a predetermined threshold;
executing, in a case where the luminance value exceeds a predetermined luminance value in a luminance value distribution of an entire screen corresponding to the imaging element, search processing for searching for an imaging range in which the luminance value is equal to or less than a predetermined luminance value while changing a relative position between the imaging element and the object image by controlling the mechanism.

19. A non-transitory computer-readable storage medium configured to store a computer program comprising instructions for executing following processes:
causing a process of estimating a degree of deterioration through time for each region of an imaging element to be executed;
causing a process of acquiring a luminance value of a screen corresponding to the region in which the degree exceeds a predetermined threshold to be executed; and
causing search processing for searching for an imaging range in which the luminance value is equal or less than a predetermined luminance value while changing a relative position between the imaging element and the object image by controlling the mechanism to be executed in a case where the luminance value exceeds a predetermined luminance value in a luminance value distribution of an entire screen corresponding to the imaging element.

* * * * *